US011741060B2

(12) United States Patent
Yang et al.

(10) Patent No.: US 11,741,060 B2
(45) Date of Patent: Aug. 29, 2023

(54) METHODS AND SYSTEMS FOR SCALABLE DEDUPLICATION

(71) Applicant: Veritas Technologies LLC, Santa Clara, CA (US)

(72) Inventors: Yong Yang, Beijing (CN); Xianbo Zhang, Plymouth, MN (US); Weibao Wu, Vadnais Heights, MN (US); Chao Lei, Beijing (CN); Yafeng Wang, Beijing (CN); Haigang Wang, Shoreview, MN (US); Lulu Wei, Beijing (CN)

(73) Assignee: Veritas Technologies LLC, Santa Clara, CA (US)

( * ) Notice: Subject to any disclaimer, the term of this patent is extended or adjusted under 35 U.S.C. 154(b) by 0 days.

(21) Appl. No.: 16/698,288

(22) Filed: Nov. 27, 2019

(65) Prior Publication Data

US 2021/0157777 A1 May 27, 2021

(51) Int. Cl.
*G06F 16/215* (2019.01)

(52) U.S. Cl.
CPC .................. *G06F 16/215* (2019.01)

(58) Field of Classification Search
USPC ........................................................ 707/692
See application file for complete search history.

(56) References Cited

U.S. PATENT DOCUMENTS

| 8,397,080 | B2* | 3/2013 | Lu .................... G06F 11/1453 713/189 |
| 8,898,120 | B1* | 11/2014 | Efstathopoulos ....... G06F 16/11 707/692 |
| 8,914,324 | B1* | 12/2014 | Guo ..................... G06F 16/1748 707/640 |
| 9,183,200 | B1 | 11/2015 | Liu et al. |
| 9,268,797 | B2* | 2/2016 | Whitehead ............ G06F 3/0608 |
| 9,684,668 | B1* | 6/2017 | Guo ..................... G06F 16/215 |
| 9,928,210 | B1 | 3/2018 | Zhang et al. |
| 9,952,933 | B1* | 4/2018 | Zhang .................. G06F 16/245 |
| 10,261,960 | B2* | 4/2019 | Regni .................. G06F 3/0608 |
| 11,307,937 | B1* | 4/2022 | Cheng ................ G06F 11/1453 |
| 11,360,699 | B1* | 6/2022 | Zhang .................. G06F 3/0619 |

(Continued)

OTHER PUBLICATIONS

Patent Cooperation Treaty ~ International Search Report and Written Opinion of the International Searching Authority for International Application No. PCT/US2020/061912; dated Mar. 12, 2021; 12 pages.

*Primary Examiner* — Cam Linh T Nguyen
(74) *Attorney, Agent, or Firm* — Womble Bond Dickinson (US) LLP

(57) ABSTRACT

Methods, computer program products, computer systems, and the like are disclosed that provide for scalable deduplication in an efficient and effective manner. For example, such methods, computer program products, and computer systems can include receiving a data object at an assigned node, determining whether the data object includes a sub-data object, and processing the sub-data object. The assigned node is a node of a plurality of nodes of a cluster, where the data object includes a data segment, and a signature. The signature is generated based, at least in part, on data of the data segment. The processing includes sending the sub-data object to a remote node. The remote node is another node of the plurality of nodes of the cluster.

21 Claims, 20 Drawing Sheets

(56) References Cited

U.S. PATENT DOCUMENTS

| | | | |
|---|---|---|---|
| 2001/0047400 A1* | 11/2001 | Coates | G06F 16/1858 |
| | | | 709/219 |
| 2012/0030477 A1* | 2/2012 | Lu | G06F 11/1453 |
| | | | 713/189 |
| 2012/0117028 A1* | 5/2012 | Gold | G06F 11/1458 |
| | | | 707/640 |
| 2014/0201171 A1 | 7/2014 | Vijayan et al. | |
| 2015/0293817 A1* | 10/2015 | Subramanian | G06F 16/184 |
| | | | 707/645 |
| 2017/0272209 A1* | 9/2017 | Yanovsky | H04L 67/1097 |
| 2018/0103084 A1* | 4/2018 | Auvenshine | G06F 16/2246 |
| 2018/0335960 A1* | 11/2018 | Paulzagade | G06F 3/065 |
| 2019/0050255 A1* | 2/2019 | Chagam Reddy | G06F 9/4881 |
| 2019/0171563 A1 | 6/2019 | Wallace | |
| 2019/0278504 A1* | 9/2019 | Matsui | G06F 3/0659 |
| 2020/0019622 A1* | 1/2020 | Lu | G06F 16/1748 |
| 2021/0096894 A1* | 4/2021 | Rupprecht | G06F 9/45545 |

\* cited by examiner

METHODS AND SYSTEMS FOR SCALABLE DEDUPLICATION

FIELD OF THE INVENTION

The present invention relates to deduplication systems and, more particularly, to methods and systems for scalable deduplication.

BACKGROUND

An ever-increasing reliance on information and computing systems that produce, process, distribute, and maintain such information in its various forms, continues to put great demands on techniques for providing data storage and access to that data storage. Business organizations can produce and retain large amounts of data. While data growth is not new, the pace of data growth has become more rapid, the location of data more dispersed, and linkages between data sets more complex. Data deduplication offers business organizations an opportunity to dramatically reduce an amount of storage required for data backups and other forms of data storage and to more efficiently communicate backup data to one or more backup storages sites.

SUMMARY

The present disclosure describes methods, computer program products, computer systems, and the like are disclosed that provide for scalable deduplication in an efficient and effective manner. Such methods, computer program products, and computer systems include receiving a data object at an assigned node, determining whether the data object includes a sub-data object, and processing the sub-data object. The assigned node is a node of a plurality of nodes of a cluster, where the data object includes a data segment, and a signature. The signature is generated based, at least in part, on data of the data segment. The processing includes sending the sub-data object to a remote node. The remote node is another node of the plurality of nodes of the cluster.

In one embodiment, the data object includes a container, which, in turn, includes a deduplicated data store and a metadata store. The deduplicated data store includes one or more data segments. The metadata store includes metadata associated with the one or more data segments. Further, the one or more data segments can include a data segment, and the metadata can include a signature identifying the data segment and a location of the data segment in the deduplicated data store. Further still, the signature can be a fingerprint, and the fingerprint can be generated by performing a hash function on data of the data segment.

In one embodiment, the data object can comprise a container, and the sending the sub-data object to the remote node further includes sending the container to the remote node and sending a container reference to the remote node. In such an embodiment, the container reference can comprise a container identifier that identifies the container.

In another embodiment, the method can include receiving the sub-data object at the remote node, storing the container in a local deduplication pool at the remote node, and storing the container reference in a local reference database at the remote node. Further, in certain embodiments, the method can also include receiving a request for a fingerprint list from a client system, retrieving the fingerprint list from a catalog, and sending the fingerprint list to the client system. Further still, in certain embodiments, the method can further include receiving a request for a location of the fingerprint list from the client system, determining the location, and sending the location to the client system. Certain embodiments implement the catalog as a single instance for the cluster.

In certain embodiments, the data object includes a container and a container reference, and the method further includes storing the container in a local deduplication pool at the assigned node and storing the container reference (that identifies the container) in a local reference database at the assigned node. In such embodiments, the container can include a deduplicated data store and a metadata store.

The foregoing is a summary and thus contains, by necessity, simplifications, generalizations, and omissions of detail; consequently those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

Embodiments of methods and systems such as those disclosed herein may be better understood, and its numerous objects, features, and advantages made apparent to those skilled in the art by referencing the accompanying drawings.

Figure 1:
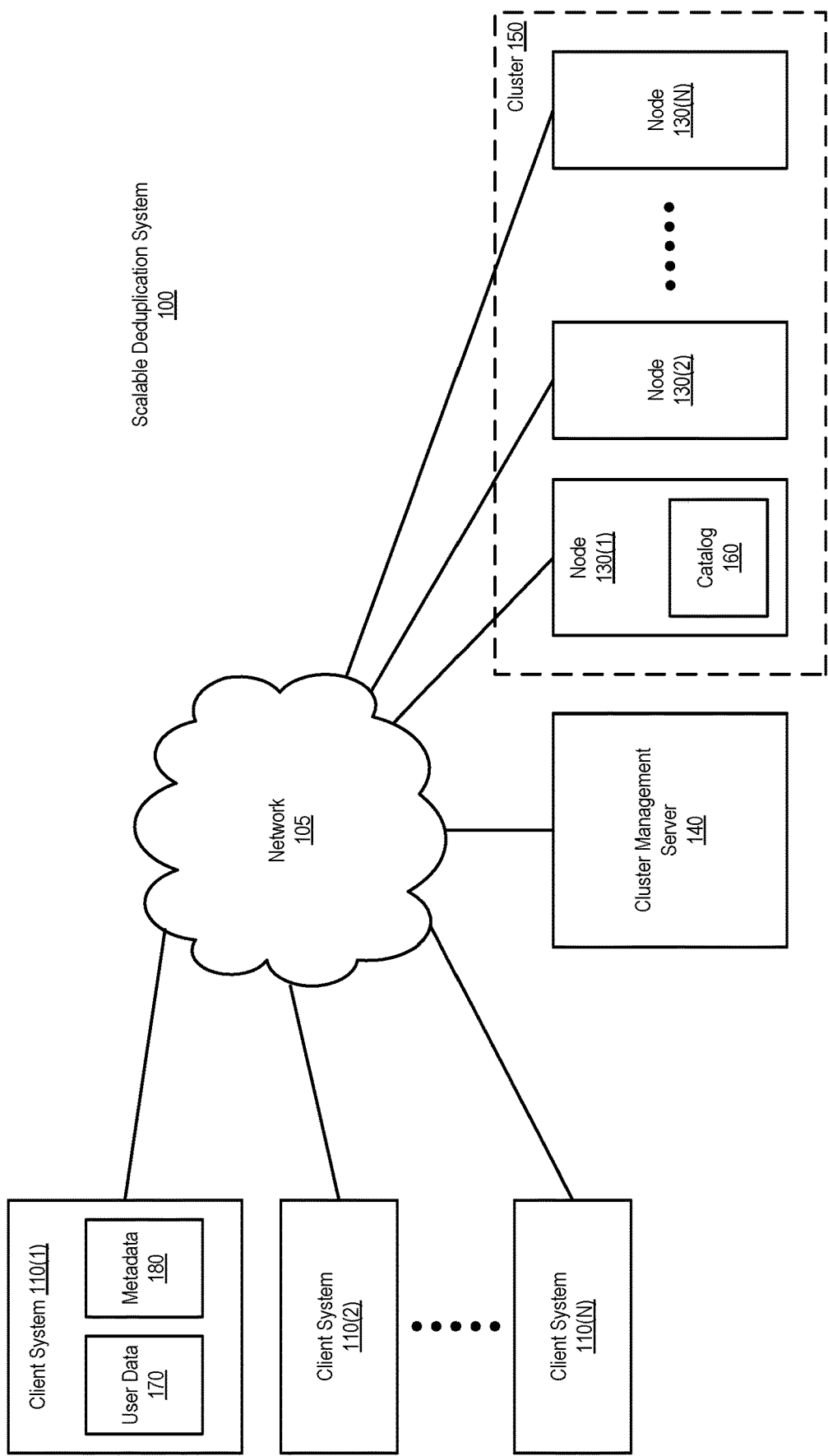
FIG. 1 is a simplified block diagram illustrating an example of components of a scalable deduplication system, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents, and alternatives falling within the spirit and scope of the present disclosure as defined by the appended claims.

DETAILED DESCRIPTION

The following is intended to provide a detailed description and examples of the methods and systems of the disclosure, and should not be taken to be limiting of any inventions described herein. Rather, any number of variations may fall within the scope of the disclosure, and as defined in the claims following the description.

While the methods and systems described herein are susceptible to various modifications and alternative forms, specific embodiments are provided as examples in the drawings and detailed description. It should be understood that the drawings and detailed description are not intended to limit such disclosure to the particular form disclosed. Instead, the intention is to cover all modifications, equivalents and alternatives falling within the spirit and scope of the appended claims.

Introduction

Methods and systems such as those described herein provide for improved performance in deduplication systems and, more particularly, for scalability in deduplicated backup systems. Such methods and systems facilitate such scalability by implementing a shared-nothing architecture that employs a single instance of the catalog that maintains information regarding one or more backup operations that have been performed using the nodes of the given cluster (though that catalog can, in certain embodiments, be distributed), and localizes the storage of deduplicated data and its associated metadata. In so doing, such an architecture creates a local deduplication pool (and a local reference database therefor) on a per-node basis. Such an architecture avoids a number of problems that would otherwise result in a distributed storage architecture.

In the aforementioned distributed storage architecture, data would be stored on multiple nodes, as would metadata therefor. In such a scenario, finding a given portion of data is more complicated, as is the potential for data and its metadata to become separated. The global signature indexing (whether centralized or distributed) comes with high maintenance costs and significantly increased implementation and operational complexity. Further, such systems can suffer from a lack of data locality, resulting in an inability to provide sufficient throughput and failing to scale with the number of nodes in the system.

Further, in the case in which deduplication is limited to one node, operations such as adding a node, load-balancing, and node failover/failback also produces a number of problems. For example, such operations, where deduplication is limited to a single node, result in a significant drop in the deduplication ratio, and inability to properly manage resource usage on the node, and abnormal increases in the backup window (owing to the inability to dynamically adjust to changes such as those just mentioned).

In implementing methods and systems such as those described herein, such architectures provide a number of advantages. For example, if a new node is added in such an architecture, certain data sources need only be redirected to the new assigned node, which is helpful with respect to load-balancing of computational and storage resources. Similarly, if one node experiences a heavy workload, one or more backup operations can be moved from that node to another of the nodes in the cluster. Further still if the given assigned node becomes full, the remainder of the data/metadata from an ongoing backup can be forwarded to another of the cluster's nodes. And in case of node failover/failback, deduplicated data and its metadata can simply be stored on another of the nodes of the cluster.

This can be accomplished, for example, by creating a local deduplication pool and associated local reference database on a per-node basis, thereby avoiding an increase in the memory requirements of any given node. In so doing, a data source's backup image is allowed to reference data on more than one node. Such implementations also maintain a desirable deduplication ratio by allowing a given backup operation to be moved from one node to another (or begun on a first assigned node, and continued on a second). Such support also provides the ability to smoothly transition backup operations from one node to another, which results in a reduction in backup window fluctuation. Further, by facilitating any node of a given cluster to be made the assigned node for a given backup operation, the fungibility of nodes in such a shared-nothing architecture reduces the architecture's complexity, as does the need to perform signature look up on only a single node. This also allows for subsequent backup images from the same data source to be stored on the same node, thereby providing data affinity and improving resource usage. Further still a load/space balance algorithm implemented in such an architecture is able to enjoy more flexibility by virtue of the aforementioned fungibility of nodes in the ability for a data source to store backup images at any one or a combination of such nodes.

Methods and systems such as those described herein are thus able to address a variety of situations. Such situations include node addition, load-balancing, node-full conditions, and node failover/failback handling. As noted, nodes can be added to or removed from a given cluster essentially at will, under the management of a cluster manager, such as a cluster management server. Such a cluster management server can also provide load-balancing in an on-demand fashion. Nodes implemented according to such methods and systems are able to hand over data/metadata from an ongoing backup to another of the nodes in the cluster. The cluster management server can also handle failover and failback of the cluster's nodes.

Such methods and systems also provide for error handling. In the case of a failure or crash of an assigned node or a remote node (nodes of the cluster that are not presently the assigned node for the given backup operation), an architecture according to embodiments such as those described herein is able to handle such scenarios in the manner of a failed backup operation. In the case of the failure of an assigned node or a remote node, any partially added reference information that is been recorded would be removed. Further, in the case of the failure of an assigned node, the data object sent by a given data source (e.g., a client system) is not recorded in the catalog, and so there is an overall reference check. Any reference and data object that has no related catalog entries would be treated as garbage, and so would be subject to garbage collection on a periodic basis. As will be appreciated in light of present disclosure, such error scenarios are infrequent, and thus the performance of such error handling is acceptable.

In addition to the aforementioned advantages, architectures according to embodiments such as those described herein provide a number of other benefits. Given the shared-nothing architecture the implementation of local reference databases and local deduplication pools provide, no cross-node data management is needed, and the performance of such architectures scales with an increase in the number of nodes employed. Such a per-node approach also means that the management of the data/metadata in question is simplified. As noted, this also means that signature look up is limited to a single node, which provides both improved performance and simpler operation, and means that nodes can be tracked on a per-backup source basis. The data sources can thus easily build client-side signature lists for such look up. Such architectures also simplify the reference and write operations from the client-side perspective because such client systems need only communicate with a single node in order to perform signature look up and data object/reference write (with the assigned node simply delegating any referencing and writing to remote nodes, if needed).

Example Architectures Providing Scalable Deduplication

FIG. 1 is a simplified block diagram illustrating components of an example scalable deduplication system (depicted in FIG. 1 as a scalable deduplication system 100), in which methods and systems of the present disclosure can be implemented. Deduplication system 100 includes a network 105 that communicatively couples one or more client systems 110(1)-(N) (collectively, client systems 110), one or more storage nodes (or more simply, nodes; depicted in FIG. 1 as nodes 130(1)-(N), and referred to collectively as nodes 130), and a cluster management server 140. As depicted in FIG. 1, cluster management server 140 provides cluster management functionality for a cluster 150 that includes one or more of nodes 130. Cluster management server 140 also supports operations associated with certain embodiments by way of communication with nodes 130, and in particular, one or more of nodes 130 that support a catalog according to such embodiments (e.g., depicted in FIG. 1 as a catalog 160). Further, cluster management server 140 not only manages failover operations, failback operations, and the like, cluster management server 140 monitors the cluster for status of its nodes and changes thereto (e.g., the addition of nodes, the removal of nodes, and the like). Cluster management server 140 is also responsible for choosing the next assigned node, using an algorithm and/or certain metrics to make such determinations.

While catalog 160 is depicted as being maintained at a single node (node 130(1)), which simplifies the operation of such embodiments, such an arrangement need not strictly be the case (e.g., catalog 160 might, in certain embodiments, be split among two or more of nodes 130). Further, while catalog 160 is depicted as being maintained at node 130(1), such an arrangement need also not be the case, and so, catalog 160 could be maintained at any of nodes 130. In supporting such operations and arrangements, cluster management server 140 provides support for a scalable backup deduplication architecture according to methods and systems such as those described herein, the features and advantages of which are discussed subsequently.

It will be noted that the variable identifiers such as those used herein (e.g., "N") are used to more simply designate the final element (e.g., client system 110(N) or nodes 130(1)-(N)) of a series of related or similar elements (e.g., client systems or nodes). The repeated use of such variable identifiers is not meant to imply a correlation between the sizes of such series of elements, although such correlation may exist. The use of such variable identifiers does not require that each series of elements has the same number of elements as another series delimited by the same variable identifier (i.e., there need be no correlation between the number of client systems and the number of nodes, nor is such correlation to be implied). Rather, in each instance of use, the variable identified may hold the same or a different value than other instances of the same variable identifier.

As noted, cluster management server 140 is communicatively coupled to client systems 110, and nodes 130 of cluster 150, via network 105. Cluster management server 140 can include one or more physical servers configured to perform a variety of tasks related to the management of cluster 150, and the implementation of backup and deduplication services for scalable deduplication system 100, such as managing a full or incremental backup for one of client systems 130. In the system illustrated in FIG. 1, cluster management server 140 is further configured to communicate with the nodes of one or more clusters under management (e.g., nodes 130 of cluster 150) for purposes of storing full or incremental backup images from client systems 110 in resources controlled by cluster management server 140. Such communication can be via network 105 or via a direct link between deduplication storage server 140 and nodes 130. Information that can be provided by deduplication storage server 140 can include a unique identification associated with each data stream provided by one of client systems 110 to one or more of nodes 130. Cluster management server 140 can also provide sequence number identification to identify sequential data transmitted in each uniquely-identified data stream, and can also provide identifying information for a given backup (although such tasks can also be managed by client systems 110 themselves). Nodes 130 can then use such information to associate received data streams from client systems 110 in accord with various embodiments, as further discussed below.

Backup services can be implemented in deduplication system 100 as a client-server application, with a server component (e.g., supported by cluster management server 140) and a client component (e.g., supported by each of client systems 110) of the client-server backup application. A server component can be configured to communicate with a client component during a backup process. Certain functions of the backup services can be performed by the client and server components, where the functions may be divided between the two components, or may be performed completely by one component or the other, depending on the implementation of the backup application. For example, cluster management server 140 can be configured to perform tasks related to managing backup operations, including communicating with client systems 110 to initiate backup tasks therefor, maintaining and managing information regarding the deduplicated backup data maintained at one or more of nodes 130, and other information regarding backups of client systems 110, as well as managing or tracking resources storing backup images for client systems 110 at one or more of notes 130. It will be appreciated that nodes 130 can include a number of storage units, logical and/or physical, and such alternatives and modifications are intended to come within the scope of this disclosure.

One or more of client systems 110 (also referred to herein as client devices) can be implemented using, for example, a desktop computer, a laptop computer, a workstation, a server, or the like. An example of such computing devices is described subsequently, in connection with FIG. 18. One or more of client systems 110 can be configured to communicate with cluster management server 140 via network 105, as noted. An example of network 105, which can be used by client systems 110 to access client management server 140 and nodes 130, is a local area network (LAN) utilizing Ethernet, IEEE 802.11x, or some other communications protocol. Network 105 can also include a wide area network (WAN) and/or a public network such as the Internet, for example.

FIG. 1 also illustrates client system 110(1) as including user data 170 and metadata 180. Each of client systems 110 can store such information, and each of client systems 110 can store different user data 170 and metadata 180 in storage local to the given one of client systems 110. As will be appreciated in light of the present disclosure, in fact, a wide variety of data, metadata, executable programs, and other such information and software accessible by each of client systems 110 can be the subject of such backup operations.

User data 170 can include various data that is generated and/or consumed by applications, users, and other entities associated with client system 110(1). Moreover, user data 170, in the embodiment shown (as well as others), can also include executable files, such as those used to implement applications and operating systems, as well as files that are used or generated by such executable files. User data 170 can include files generated by user applications (e.g., word processing programs, email programs, graphics programs, a database application, or the like) executing on client system 110(1). Some of user data 170 may also be transferred to backup server 130 and/or deduplication storage server 140 via a network 105 to be included in a deduplicated data store. Each of client systems 110 can send different user data 170 to backup server 130 and/or deduplication storage server 140.

Metadata 180 can include, for example, information regarding user data 170. Metadata 180 can be generated by client system 110(1), such as during a backup process. Upon an entity (e.g., an application or human user) requesting that client system 110(1) add all or part of user data 170 to a deduplicated data store (e.g., as part of a regularly scheduled full or partial backup), client system 110(1) reads user data 170 and generates metadata 180 regarding user data 170, such as one or more identifiers (e.g., signatures, hashes, fingerprints, or other unique identifiers) that identify different portions of user data 170. Client system 110 can process and communicate metadata 180 as a list (e.g., a list of signatures) to one or more of nodes 130 and/or deduplication storage server 140. Metadata 180 can be used by client system 110(1), along with information received from one or more of nodes 130 and/or deduplication storage server 140, to determine whether a portion of user data 170 is a duplicate (and so need only be referenced), or is unique (not duplicative of the data already stored at one of nodes 130), and so, should be sent to the assigned node of notes 130, and added to the reference database and deduplication pool thereof, as further discussed below.

In the architecture depicted in FIG. 1, nodes 130 variously store deduplicated data (e.g., in a local deduplicated data store (that is, local to each of nodes 130)), and its associated metadata (e.g., in a local reference database (that is, local to each of nodes 130) and/or as metadata in a metadata store of a container in which the aforementioned data is stored). By breaking user data 170 into some number of pieces (subunits of data) and deduplicating those pieces of data when performing a backup operation on user data 170, the components of scalable deduplication system 100 are able to transfer and store the data of the resulting backup image more efficiently, as the result of identifying unique ones of such subunits of data (or conversely, duplicate ones of such subunits of data).

For example, deduplication storage server 140 can manage deduplication services such as may be provided by a combination of the functionalities of client systems 110 and nodes 130 that eliminate duplicate data content in a backup context. As noted, deduplication services help reduce the amount of storage needed to store backup images of enterprise data (e.g., user data 170) and the resources consumed in communicating such backup images by providing a mechanism for storing a piece of information (e.g., a subunit of data) only once. Thus, in a backup context, if a piece of information is stored in multiple locations within an enterprise's computing systems (e.g., in multiple locations at a given one of client systems 110 and/or at multiple ones of client systems 110), that piece of information will only be stored once in a deduplicated backup image. Also, if the piece of information does not change between a first backup and a second backup, then that piece of information need not (and in certain embodiments, will not) be stored during the second backup, so long as that piece of information continues to be stored in the deduplicated backup image stored at one or more of notes 130. Data deduplication can also be employed outside of the backup context, thereby reducing the amount of active storage occupied by files containing duplicate data (e.g., in their entirety, or in part).

As will be appreciated in light of the present disclosure, deduplication services can also be implemented in a scalable deduplication system 100 as a client-server application (not shown), with a server component (e.g., residing on deduplication storage server 140) and a client component (e.g., residing on one or more of client systems 110) of the client-server application. For example, during a backup process for storing a backup of user data 170 in the local deduplicated data stores of one or more of nodes 130, a client component of the deduplication services can be configured to generate metadata 180 regarding user data 170, such as one or more identifiers, or signatures, that can identify different portions of user data 170, and to communicate metadata 180 to a server component. Certain functions of the deduplication services can be performed by the client and server components, where the functions may be divided between the two components, or may be performed completely by one component or the other, depending on the implementation of the backup application.

It will be appreciated that each of the foregoing components of scalable deduplication system 100, as well as alternatives and modifications thereto, are discussed in further detail below. In this regard, it will be appreciated that network storage can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives, removable storage in a robot or standalone drive, and the like. Alternatively, it will also be appreciated that, in light of the present disclosure, scalable deduplication system 100 and network 105 can include other components such as routers, firewalls and the like that are not germane to the discussion of the present disclosure and will not be discussed further herein. It will also be appreciated that other configurations are possible.

Figure 2:
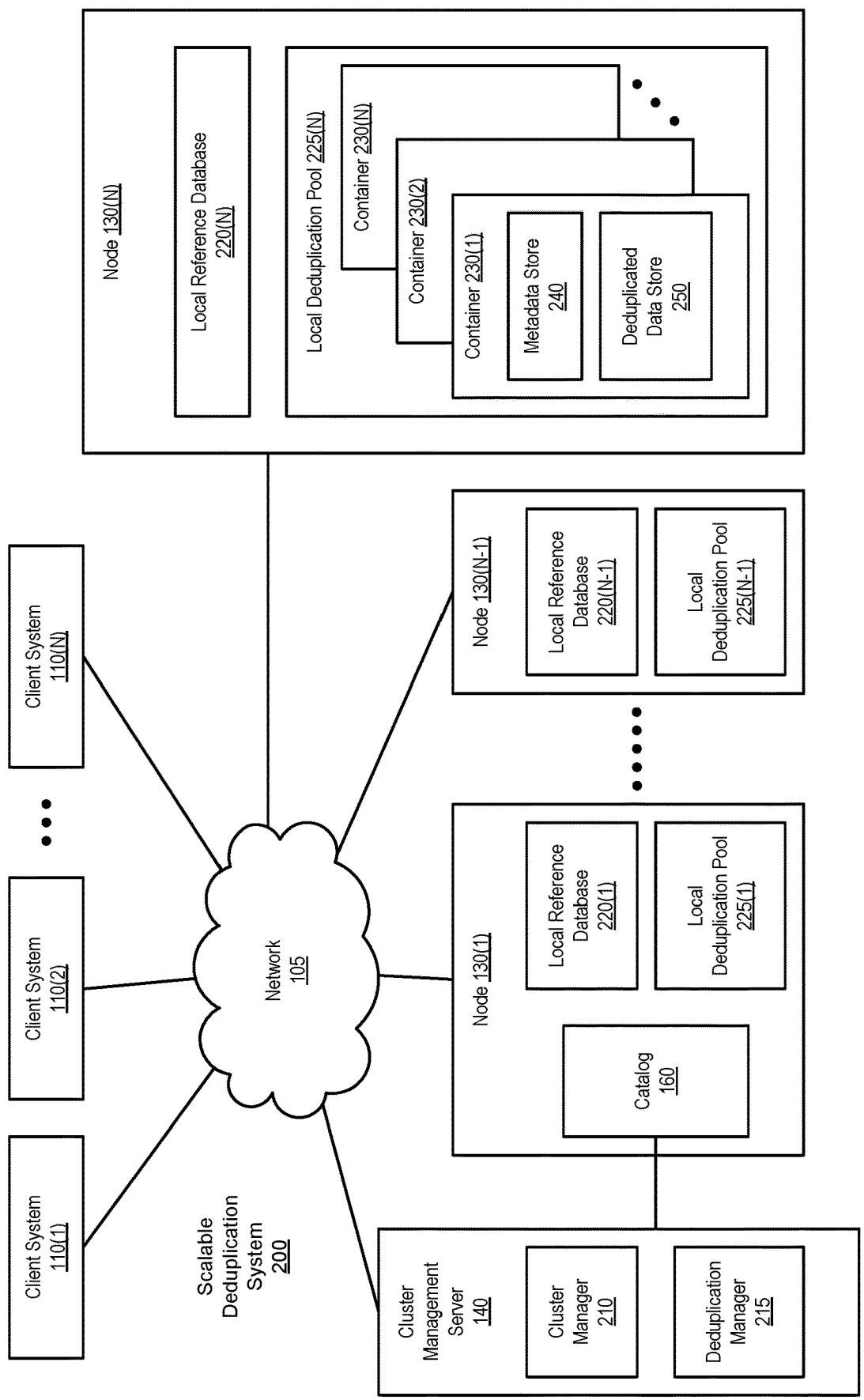
FIG. 2 is a simplified block diagram illustrating an example of certain components of a scalable deduplication system in greater detail, according to one embodiment.

FIG. 2 is a simplified block diagram illustrating an example of certain components of a scalable deduplication system in greater detail, according to one embodiment, and so depicts a scalable deduplication system 200. As before, scalable deduplication system 200 includes a number of client systems (client systems 110), a cluster management server (cluster management server 140), and a number of nodes (nodes 130), communicatively coupled to one another by way of a network (network 105). As noted earlier, cluster management server 140 can provide functionality including cluster management (e.g., as by way of a cluster manager 210) and deduplication management (e.g., as by way of a deduplication manager 215). It is to be understood that while cluster manager 210 and deduplication manager 215 are depicted in FIG. 2 as being separate from one another, their functionality can be integrated.

Also depicted in FIG. 2 is catalog 160, which is illustrated as being maintained at node 130(1). While thus illustrated, it is to be appreciated that catalog 160 can be distributed among more than one of notes 130, and can be distributed among storage units of node 130(1). It is to be understood, however, that scalable deduplication system 200 typically maintains only a single instance of catalog 160 as the active catalog for the given cluster, at any one time (although, allowing for other instances of catalog 160 to exist as inactive instance, for the given cluster, which are therefore not available to the backup processes of scalable deduplication system 200).

Nodes 130 can maintain information such as a local reference database (e.g., examples of which are depicted in FIG. 2 as local reference databases 220(1)-(N), which are referred to in the aggregate as local reference databases 220) and a local deduplication pool (e.g., examples of which are depicted in FIG. 2 as local deduplication pools 225(1)-(N), which are referred to in the aggregate as local deduplication pools 225). Local reference databases 220 include information such as, for example, information identifying the containers in the local deduplication pool, information identifying the backup to which a given subunit of data (e.g., data segment) belongs, a fingerprint or other signature for that subunit of data, the location of that subunit of data in the corresponding one of local deduplication pools 225, and other such useful information. Further, a node's local reference database can not only reference data segments stored in that node's local deduplication pool, but can also reference data segments stored in other nodes' local deduplication pools (or the containers stored therein, e.g., as by way of container identifiers and note identifiers). Local deduplication pools 225 include the aforementioned subunits of data (data segments), as well as certain metadata associated therewith. In certain embodiments, local deduplication pools can be maintained in memory at their respective ones of nodes 130 (in order to provide improved performance), and subsequently persisted to persistent storage, while local reference databases 220 are maintained on such persistent storage.

In this regard, an example with further detail of local reference databases 220 and local deduplication pools 225 is presented in connection with node 130(N). As with others of notes 130, node 130(N) includes a local reference database (a local reference database 220(N)) and a local deduplication pool (a local deduplication pool 225(N)). Local reference database 220(N) can include, for example, references to the data segments stored in local deduplication pool 225(N). Local deduplication pool 225(N), in turn, can include a number of containers (e.g., depicted in FIG. 1 as containers 230(1)-(N), referred to in the aggregate as containers 230), for example. Containers 230 each include a metadata store (e.g., an example of which is depicted in FIG. 1 as a metadata store 240) and a deduplicated data store (e.g., an example of which is depicted in FIG. 1 as a deduplicated data store 250). Examples of such metadata stores and deduplicated data stores are described in further detail in connection with FIG. 3, subsequently. Node 130(N) maintains local reference database 220(N) and local deduplication pool 225(N) to maintain the deduplicated data for which node 130(N) is responsible. In so doing, the architecture of scalable deduplication system 200 implements a share-nothing architecture, in which one or more of nodes 130 can be replaced by other such nodes (e.g., as by moving a given node's local reference database and local deduplication pool to the other node), node failure can be efficiently and effectively addressed, and other such advantages enjoyed.

As will be appreciated in light of the present disclosure, while a deduplication pool such as local deduplication pool 225(N) can maintain deduplicated data segments directly (e.g., as a storage area in which deduplicated data can be stored, and so storing only such deduplicated data segments, with all metadata residing, for example, in a local reference database such as local reference database 220(N)), local deduplication pool 225(N) is depicted in FIG. 2 as including a number of containers (depicted in FIG. 2 as containers 230(1)-(N), which are referred to in the aggregate as containers 230). An example of the contents of such containers (which are to be understood as logical in nature) is container 230(1), which includes metadata store 240 and deduplicated data store 250. In the implementation of containers 230 illustrated in FIG. 2, the deduplicated data segments stored in deduplicated data store 250 are referred to by information (e.g., fingerprints or other signature information) stored in metadata store 240, along with information about the portions of backup images stored in the corresponding local deduplication pool (e.g., such as that described previously). In such an implementation, local reference database 220(N) can include information (e.g., fingerprints or other signature information, container information, data segment offsets, and/or other information) that allows one or more of client systems 110 to determine whether a given deduplicated data segment is resident on the note in question (e.g., node 130(N)), while information in metadata store 240 allows the client system in question to find the given deduplicated data segment (e.g., in the case of the client system performing a restoration operation) or update a reference thereto (e.g., in the case of the client system performing a backup operation).

An example of this latter implementation is also described in further detail in connection with FIG. 3, subsequently.

In light of the foregoing, it will be appreciated that various metadata maintained by each of nodes 130 can be stored in that node's local reference database, allowing client systems 110 to determine if portions of a backup image (e.g., portions of user data 170) are non-duplicative of portions already stored in the corresponding local deduplication pool. Once the client system in question determines that a portion of user data 170 is not duplicative of the data already stored in the assigned node's local deduplication pool (and thus should be added thereto), the client system can store that portion of user data 170 and its corresponding identifier (fingerprint or other signature) for the portion in a data object (e.g., a container, such as those discussed subsequently), and subsequently send the resulting data object to the assigned node. Examples of processes that can support such operations are described subsequently in connection with FIGS. 6-16.

On the assigned node, in certain embodiments employing containers, once a given container is full of unique portions, the entire container can be written to a location in the local deduplication pool. The container written to the local deduplication pool can also include a local container index, which indicates a local location of each unique portion stored within the container (or other such storage construct). This information can be maintained, for example, in the assigned node's local reference database. The local container index can contain a signature associated with each unique segment stored in the container, or alternatively can contain a shortened version of the signature of each unique segment stored in the container. An assigned node (e.g., node 130(N) in the present example) can store a reference to the container that identifies the container (e.g., a container reference such as a container identifier) in its local reference database. The signature of a unique portion can also be associated with the location of the unique portion in an entry of its container's metadata store. Thus, an identification of a portion's location, or a container identifier, can be found using the signature of the portion as a key in the metadata maintained at the assigned node. The location of the portion within the container identified by the container identifier can be found in the local container index for the container (local reference database) by using at least a portion of the signature as a key in that index, for example.

Multiple backup images can be stored by nodes 130. For example, a first backup image can be captured from user data 170 and can be stored in the local deduplication pools of one or more of nodes 130. A subsequent backup image captured from user data 170 can contain duplicate portions that are identical to portions of the first backup image already stored at nodes 130 and can contain unique portions that are different from portions of the first backup image (and so, portions that correspond to changes made to user data 170). The unique portions of the subsequent backup image can be sent to notes 130, while the duplicate portions are not sent (since the duplicate portions are identical to instances of portions already stored by nodes 130). Since only single instances of portions of a backup image are stored at nodes 130, the local reference database and/or metadata stores at each node can provide a mapping of a backup image to the various non-duplicative portions that compose the backup image, which are stored in their respective local deduplication pools. Thus, a single backup image can be associated with multiple portions stored throughout scalable deduplication system 200, and multiple backup images can be associated with a single portion (e.g., the multiple backup images share the single portion).

Figure 3:
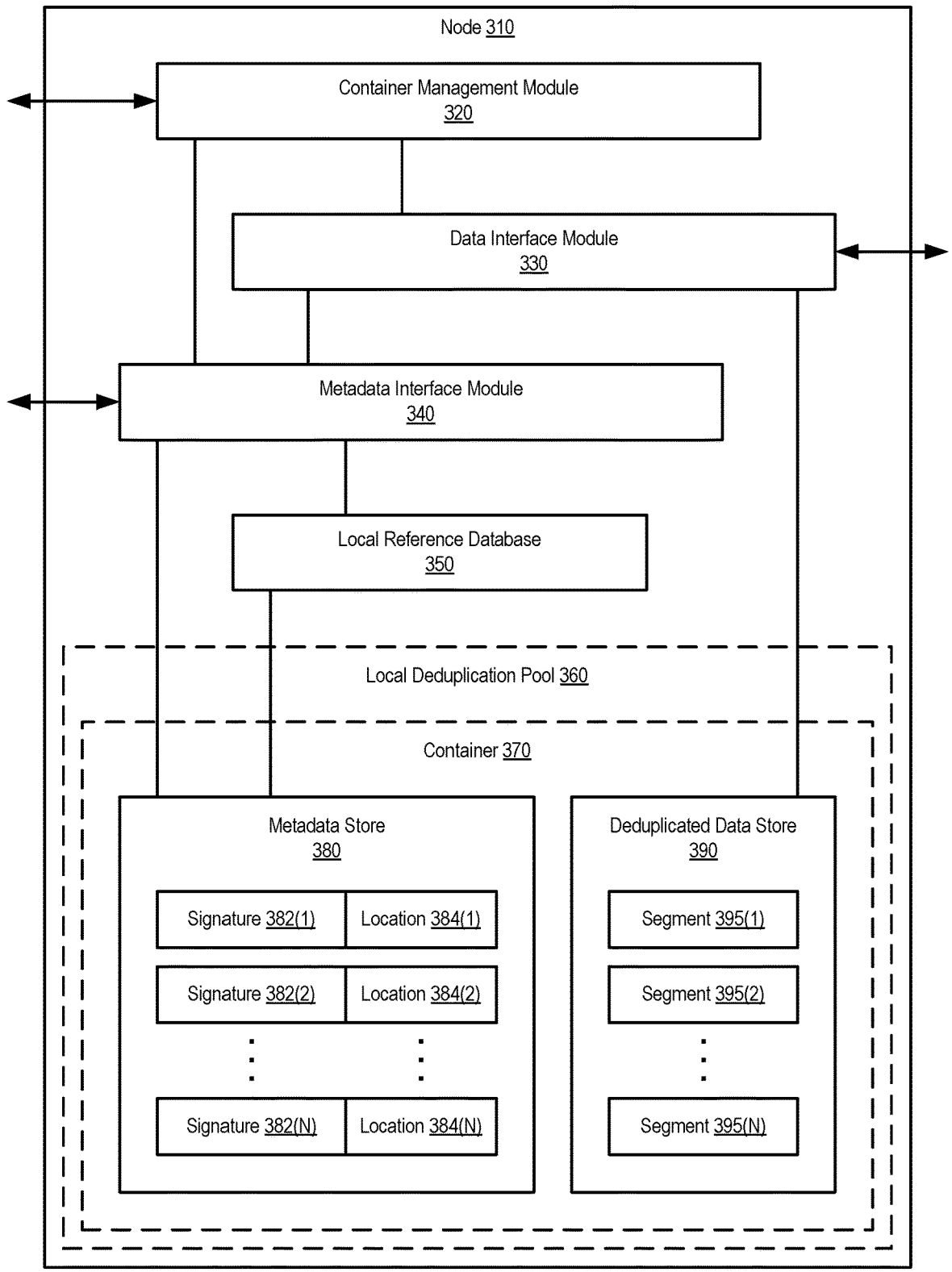
FIG. 3 is a simplified block diagram illustrating an example of components of a scalable deduplication system, in which data and metadata stores are depicted in greater detail, according to one embodiment.

FIG. 3 is a simplified block diagram illustrating an example of components of a node in a scalable deduplication system, in which data and metadata stores are depicted in greater detail, according to one embodiment. Thus, FIG. 3 depicts a scalable deduplication system 300 (portion of a scalable deduplication system such as scalable deduplication system 200), and more particularly, a node 310 therein (e.g., in the manner of node 130(N) depicted in FIG. 2). In this more detailed depiction, node 310 can be seen to include a container management module 320, a data interface module 330, and a metadata interface module 340. In the manner of node 130(N), node 310 also maintains a local reference database 350 (in the manner of local reference databases 220 of FIG. 2) and a local deduplication pool 360 (in the manner of local deduplication pools 225 of FIG. 2). Local deduplication pool 360 includes one or more containers (e.g., an example of which is depicted in FIG.3 as container 370).

In turn, container 370 includes a metadata store (in the manner of metadata store 240 of FIG. 2), which includes a number of signatures (e.g., fingerprints; depicted in FIG. 3 as signatures 382(1)-(N), and referred to in the aggregate as signatures 32) and associated locations (depicted in FIG. 3 as locations 384(1)-(N), and referred to in the aggregate as locations 384) of their associated data segments, which are depicted as being stored in a deduplicated data store 390 as segments 395(1)-(N) (and referred to in the aggregate as segment 395).

In order to perform data deduplication, a deduplication system needs to be able to identify redundant copies of data (e.g., files, data segments, or other units of data). One way that can provide a reasonable likelihood of finding duplicated instances of data is to divide file data into segments (e.g., data segments, such as consistently-sized segments, although techniques for using variable-sized segments exist), which are analyzed for duplication in the deduplicated data store. Thus, if only a portion of a large file is modified, then only the segment of data corresponding to that portion of the file need be stored (e.g., as one of segments 395 deduplicated data store 390) and the remainder of the file segments need not be stored. In embodiments such as those described herein, a backup image file can be divided into a plurality of chunks, and each chunk can be divided into a plurality of fixed-size segments, for example. Thus, a signature can be searched for in signatures 382, and if a match is found, the location of the corresponding one of segment 395 can be determined using the corresponding one of locations 384. In certain embodiments, such searching is performed by one of client systems 110 by such client system sending a request for the requisite metadata (e.g., information from local reference database 350 and/or metadata from the metadata stores of the relevant ones of the containers in question (e.g., metadata store 380)), as is discussed subsequently.

That being the case, rather than comparing a segment itself to each segment stored in deduplication data store (which can be enormously time- and processing-prohibitive), detection of duplicative data is usually performed by comparing smaller data signatures of each data segment. Client systems 110 can thus use a signature such as signatures 382 to determine whether a given segment is already stored in deduplicated data store 390. Each such signature can be a checksum or hash value that is calculated based on data within the data segment. In many embodiments, signatures such as fingerprints can be generated in a manner that produces the same identifier for identical items of data (e.g., using a cryptographically strong, collision resistant hash function), while also producing different identifiers for non-identical items of data. Regardless of which particular technique is used to generate such signatures, the same signature-generation technique will typically be implemented by all deduplication performed by client systems 110, although techniques exist to allow for the use of multiple signature-generation techniques. In one example, signature generation can be performed by deduplication clients (e.g., client software modules running on client systems 110 of FIG. 1). Signatures generated by client software on client systems 110 can be used to search signatures provided by nodes such as notes 130. In so doing, such an approach avoids the need to communicate duplicate data segments, and so is significantly less resource intensive (given that the corresponding signatures are significantly smaller, in terms of size, compared to the data segments they represent). That being the case, client systems 110 need only communicate the unique data segments (and their associated signatures) to the appropriate one(s) of notes 130.

By comparing a newly generated signature of a new segment to signatures 382 of segments 395, client systems 110 can determine whether the new segment should be added to deduplicated data store 390 (e.g., the new segment is a unique segment). In particular, if a new segment's signature does not match any existing signatures maintained by notes 130, the client system in question can determine that the new segment is not already stored within those segments. In response, a client system can add the new segment and its signature to a data object that will be sent to the assigned node of notes 130, upon completion of the backup operation, as described subsequently herein. The client system in question, one of client systems 110, can use the metadata that client system maintains (e.g., metadata 180) to provide additional information to the assigned node (e.g., identify each requested segment by its corresponding signature, backup identifier, time and date, and/or other information). Client systems 110 can transmit the requisite segments, associated fingerprints, and other associated information over network 105 via a data stream, for example.

As the requested segments are received, the assigned node can write the segments into a fixed-size container located in its memory, such as a cache. Once the container is full, the entire container can be written to a location in its local deduplication pool. As noted, this operation can also be performed with respect to a container (or, depending on the implementation, the data segments stored therein) stored in a cloud deduplication pool such. The assigned node can also use metadata generated thereby, such as locations 384, that indicates the location of each segment written to deduplicated data store 390. For example, each unique segment can be associated with a location (e.g., location 384(1)) of the particular segment, such as a container identification (container ID) that contains the unique segment (e.g., segment 395(1)).

Figure 4:
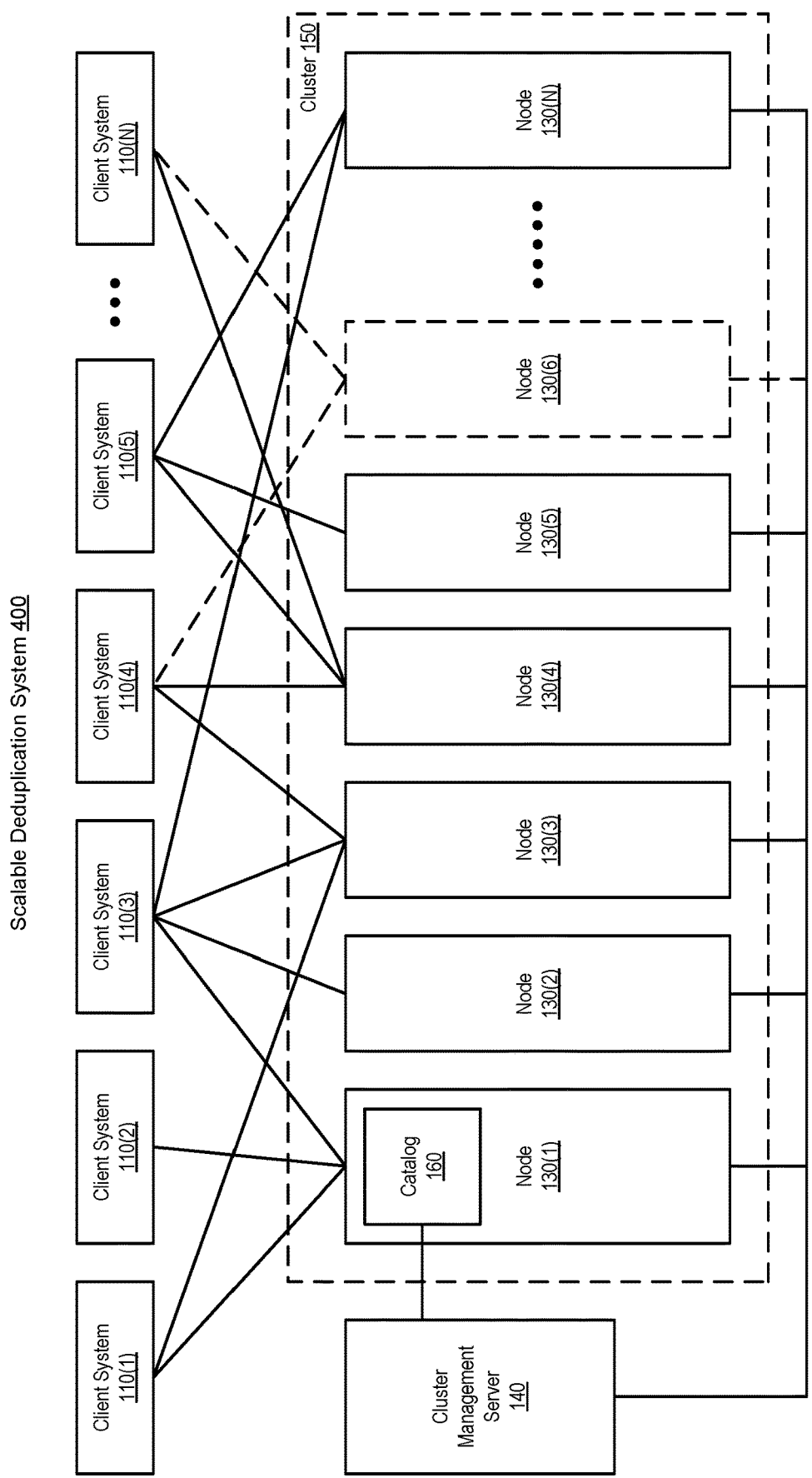
FIG. 4 is a simplified block diagram illustrating an example of components of a scalable deduplication system, in which certain communicative couplings and changes therein are depicted, according to one embodiment.

FIG. 4 is a simplified block diagram illustrating an example of components of a scalable deduplication system, in which certain communicative couplings and changes therein are depicted, according to one embodiment. A scalable deduplication system 400, in the manner of other such scalable Deduplication systems, is thus depicted as including a number of client systems (client systems 110), a number of nodes (nodes 130, which are members of cluster 150), and a cluster management server (cluster management server 140). As also depicted earlier, cluster management server 140 has access to a catalog (catalog 160) maintained at node 130(1), and is communicatively coupled to notes 130 (and also, though not shown in FIG. 4, to client systems 110). Scalable deduplication system 400 is presented here to illustrate concepts related to the addition of one or more nodes to cluster 150, and removal of one or more nodes from cluster 150.

In the former case, a node such as node 130(6) might be added to cluster 150 in order to provide additional deduplication pool resources to cluster 150. In such a case, cluster management server 140 will manage the inclusion of node 130(6) in cluster 150, and in so doing, provide such added resources to client systems 110. Ones of client systems 110 (e.g., client systems 110(4) and 110(N), in the example presented in FIG. 4, as indicated by the dashed lines appearing therein) can avail themselves of such additional resources in situations such as their present assigned node becoming full, for purposes of load-balancing, and other such advantageous purposes. The architecture of scalable deduplication system 400 and other such implementations are able to take advantage of their shared-nothing architecture in such situations as a result of the fungibility of the nodes employed therein.

In the latter case, a node such as node 130(6) might be removed from cluster 150 as the result of, for example, the need for maintenance of such a node's hardware or software. In such a case, cluster management server 140 again manages the removal of node 130(6) from cluster 150, which can include moving or copying the node's local reference database and local deduplication pool to another of nodes 130, thereby allowing node 130(6) to be gracefully taken off-line and shutdown. Here again, access to node 130(6) by client systems 110(4) and 110(N) is shifted to ones of nodes 130 to which the local reference database and local deduplication pool in question are moved (again, in the example presented in FIG. 4, as indicated by the dashed lines appearing therein), where the movement of such information could be, for example, to node 130(4) four client systems 110(4) and 110(N).

Figure 5:
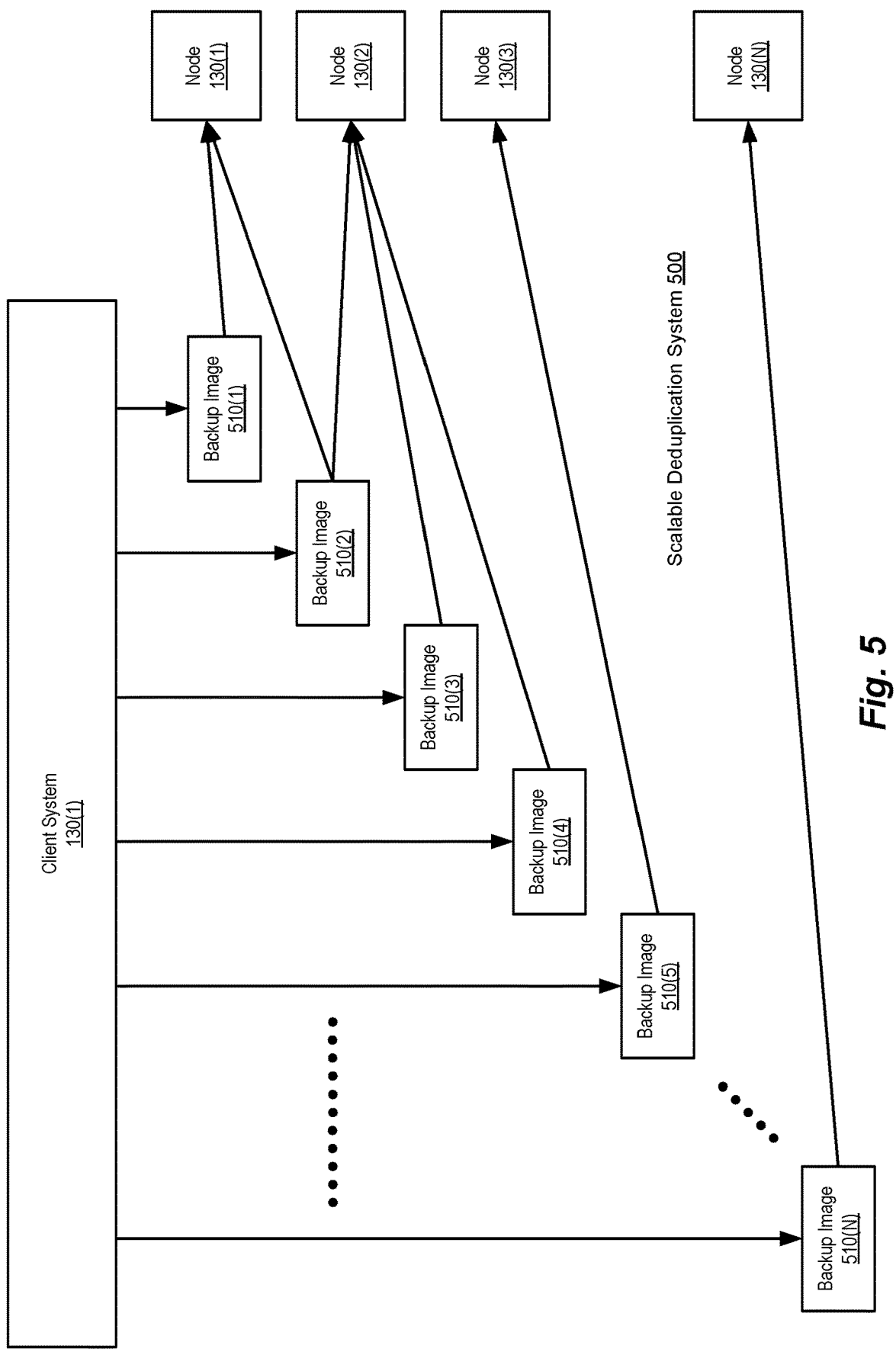
FIG. 5 is a simplified block diagram illustrating an example of components of a scalable deduplication system, in which the relationship between various backups and the nodes on which those backups are stored is depicted, according to one embodiment.

FIG. 5 is a simplified block diagram illustrating an example of components of a scalable deduplication system, in which the relationship between various backups and the nodes on which those backups are stored is depicted, according to one embodiment. Using certain components described in connection with FIGS. 1-4, a scalable deduplication system 500 is depicted, in which a number of backups are made (thereby allowing a description of the processes involved). That being the case, client system 130(1) generates a number of backup images (e.g., depicted in FIG. 5 as backup images 510(1)-(N), which are referred to in the aggregate as backup images 510), which are stored variously among nodes 130(1)-(N). As will be appreciated in light of the present disclosure, backup images 510 can be representative of full or incremental backup operations.

As is illustrated, backup images can be stored entirely on a single node, split between nodes (e.g., in the case in which the storage of a first assigned node becomes full), or stored with other backup images at a given node. In the situation depicted in FIG. 5, node 130(1) stores backup image 510(1) in its entirety, and a portion of a backup image 510(2). The remainder of backup image 510(2) is stored at node 130(2), along with backup images 510(3) and 510(4), in their entirety. By contrast, backup image 510(5) is stored alone and in its entirety at node 130(3), as is the case for backup image 510(N) being stored at node 130(N).

Example Processes for Scalable Deduplication Systems

Figure 6:
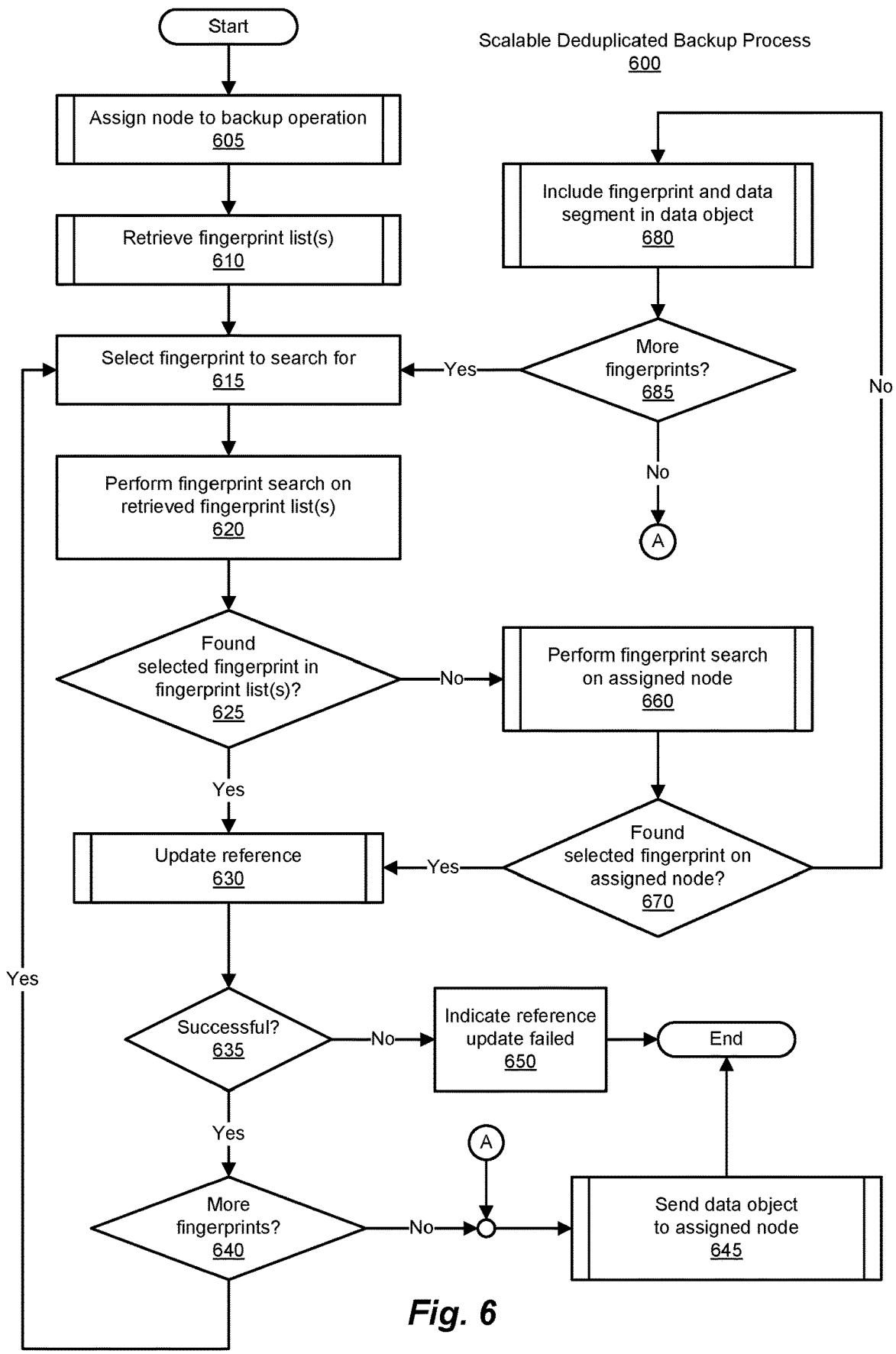
FIG. 6 is a flow diagram illustrating an example of a scalable deduplicated backup process implemented in a scalable deduplication system, according to one embodiment.

FIG. 6 is a flow diagram illustrating an example of a scalable deduplicated backup process implemented in a scalable deduplication system, according to one embodiment. FIG. 6 thus depicts a scalable be duplicated backup process 600, which begins with the assignment of an assigned node to the backup operation to be performed (605). An example of a process for assigning an assigned node to a backup operation is provided in connection with FIG. 7 and its description, subsequently.

Next, one or more fingerprint lists are retrieved (610). For example, a fingerprint list corresponding to the deduplicated data segments of the last full backup operation may be retrieved. Additionally, one or more fingerprint lists corresponding to the deduplicated data segments of one or more incremental backup operations performed subsequent to the last full backup operation may also be retrieved. An example of a process for retrieving such fingerprint lists is described in connection with FIG. 8, subsequently.

Having retrieved the requisite fingerprint list(s), scalable deduplicated backup process 600 proceeds with the selection of a fingerprint for the first (or next) data segment that is to be searched for (615). Scalable deduplicated backup process 600 then searches the fingerprint list(s) for the selected fingerprint (620). A determination is then made as to whether the selected fingerprint was found in the fingerprint list(s) in question (625).

In the case in which the selected fingerprint is found in one of the fingerprint lists, a process of updating a reference to the (deduplicated) data segment, which is already stored on the assigned node or one of the other (remote) nodes, is performed (630). An example of a process for updating such references is provided in connection with FIGS. 9 and 10, and their associated descriptions, subsequently. Further, it is to be appreciated that, while nodes other than the assigned node are among the nodes of the cluster in question (e.g., nodes 130 of cluster 150), such nodes are referred to herein as remote nodes, in order to distinguish such remote nodes from the assigned node (the node at which any data segments resulting from the current backup operation, as well as any associated metadata (e.g., fingerprints) are stored).

A determination is then made as to whether the reference update operation was successful (635). If the reference update operation was successful, a determination is then made as to whether further fingerprints remain to be selected and searched for (640). If further fingerprints remain to be searched, scalable deduplicated backup process 600 loops to the selection of the next fingerprint to be searched for (615). Otherwise, if the fingerprints for the backup operation have been searched, one or more data objects (though typically, one data object) are sent to the assigned node (645). Such a data object can be, for example, a container such as one of containers 230 in FIG. 2. An example of a process for sending a data object to an assigned node is provided in connection with FIG. 13 and its associated description, subsequently. Scalable deduplicated backup process 600 then concludes.

Alternatively, in the case in which the reference update operation was not successful (635), an indication is provided (e.g., such as to cluster management server 140), indicating that the reference update operation has failed (650). Scalable deduplicated backup process 600 then concludes.

Returning to the determination as to whether the selected fingerprint was found in the fingerprint lists in question (625), if the selected fingerprint was not found in those fingerprint lists, a fingerprint search process is performed on the assigned node (660). An example of a process for performing a fingerprint search process on the assigned node is described in greater detail in connection with FIG. 11, subsequently.

A determination is then made as to whether the selected fingerprint was found as a result of the search performed on the assigned node (670). If the selected fingerprint was found on the assigned node, the reference update process noted earlier is performed (630). As before, a determination as to the success of this reference update operation is made (635). If the reference update operation was successful, a determination is made as to whether additional fingerprints remain to be searched (640), and either scalable deduplicated backup process 600 loops to the selection of the next fingerprint (615) or any data object produced by scalable deduplicated backup process 600 is sent to the assigned node (645) (with scalable deduplicated backup process 600 then concluding).

Alternatively, if the selected fingerprint is not found on the assigned node (670), scalable deduplicated backup process 600 proceeds with the inclusion of the selected fingerprint and the data object associated there with in the data object noted earlier (680). As will be appreciated in light of the present disclosure, such an instance reflects that the data segment in question is unique (its fingerprint having not been found), and so no copy thereof being stored on the cluster's nodes. An example of a process for including fingerprints and their associated data segments in the data object is described in connection with FIG. 12, subsequently.

A determination is then made as to whether additional fingerprints remain to be searched (685). If further fingerprints remain to be searched, scalable deduplicated backup process 600 loops to the selection of the next fingerprint to be searched for (615). Otherwise, if the fingerprints for the backup operation have been searched, one or more data objects (though typically, one data object) that have been created are sent to the assigned node (645) (by way of connector "A"). As noted, an example of a process for sending a data object to an assigned node is provided in connection with FIG. 13 and its associated description, subsequently. Scalable deduplicated backup process 600 then concludes.

Figure 7:
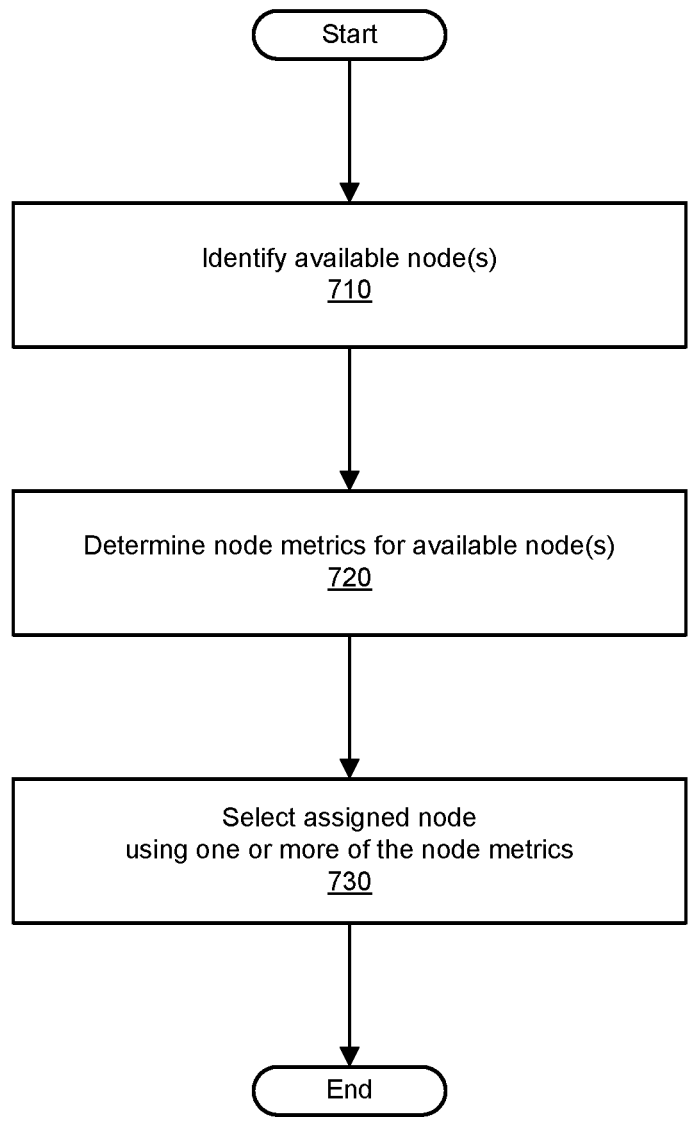
FIG. 7 is a flow diagram illustrating an example of a assigned node selection process implemented in a scalable deduplication system, according to one embodiment.

FIG. 7 is a flow diagram illustrating an example of a assigned node selection process implemented in a scalable deduplication system, according to one embodiment. An assigned node selection process 700 begins with the identification of one or more available nodes (e.g., one or more of notes 130 available for selection as an assigned node) (710). A determination is then made as to one or more metrics (node metrics) available for use in selecting the assigned node (720). Such metrics can include gathering information with regard to the workload of each node available for selection (and so selecting the node with the lowest workload), selecting the node with the largest amount of free space (which could be based, for example, on how recently the node was added to the cluster), data affinity, the capabilities of each node (e.g., computational performance, network bandwidth supported, proximity (logical and/or physical), age of backup information stored (increasing the likelihood of duplicates), or the like), or other such factors. The available node(s) and one or more node metrics having been determined, and assigned node is selected from the available nodes, using the one or more node metrics (730). Assigned node selection process 700 then concludes.

Figure 8:
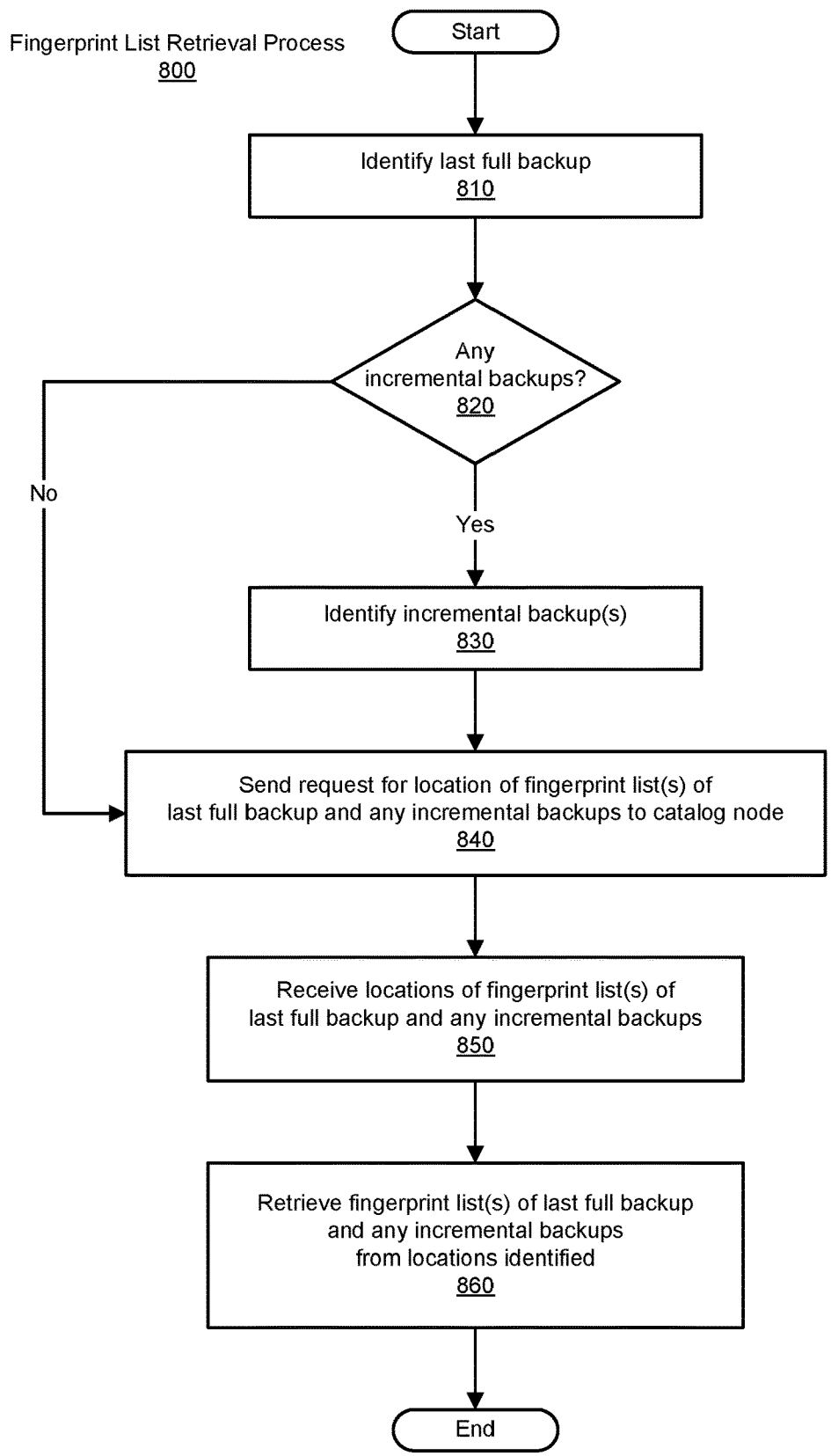
FIG. 8 is a flow diagram illustrating an example of a fingerprint list retrieval process implemented in a scalable deduplication system, according to one embodiment.

FIG. 8 is a flow diagram illustrating an example of a fingerprint list retrieval process implemented in a scalable deduplication system, according to one embodiment. A fingerprint list retrieval process 800 is thus depicted, and begins with the identification of a last full backup of the data in question (backup image) by the scalable backup deduplication system (810). A determination is then made as to whether any incremental backups (backup images) have been made subsequent to the last full backup (820). Such might be the case, for example, in an architecture in which changes made to the data are tracked subsequent to such full backup. If one or more incremental backups exist, those incremental backups are identified (830). Having identified the last full backup and any incremental backups, fingerprint list retrieval process 800 proceeds to sending a request for the requisite fingerprint list(s) to the catalog node (840), the catalog node being the one or more nodes of notes 130 at which the catalog for the last full backup in any incremental backups is stored. Information as to such catalog nodes can be provided, for example, by a cluster management server such as cluster management server 140.

In return (e.g., as from the aforementioned cluster management server), the locations of the fingerprint lists for the last full backup and any incremental backups are received by the client system (850). Next, using this information, the client system can retrieve the requisite fingerprint lists for the last full backup and any incremental backups from the locations identified therein (860). Fingerprint list retrieval process 800 then concludes.

Figure 9:
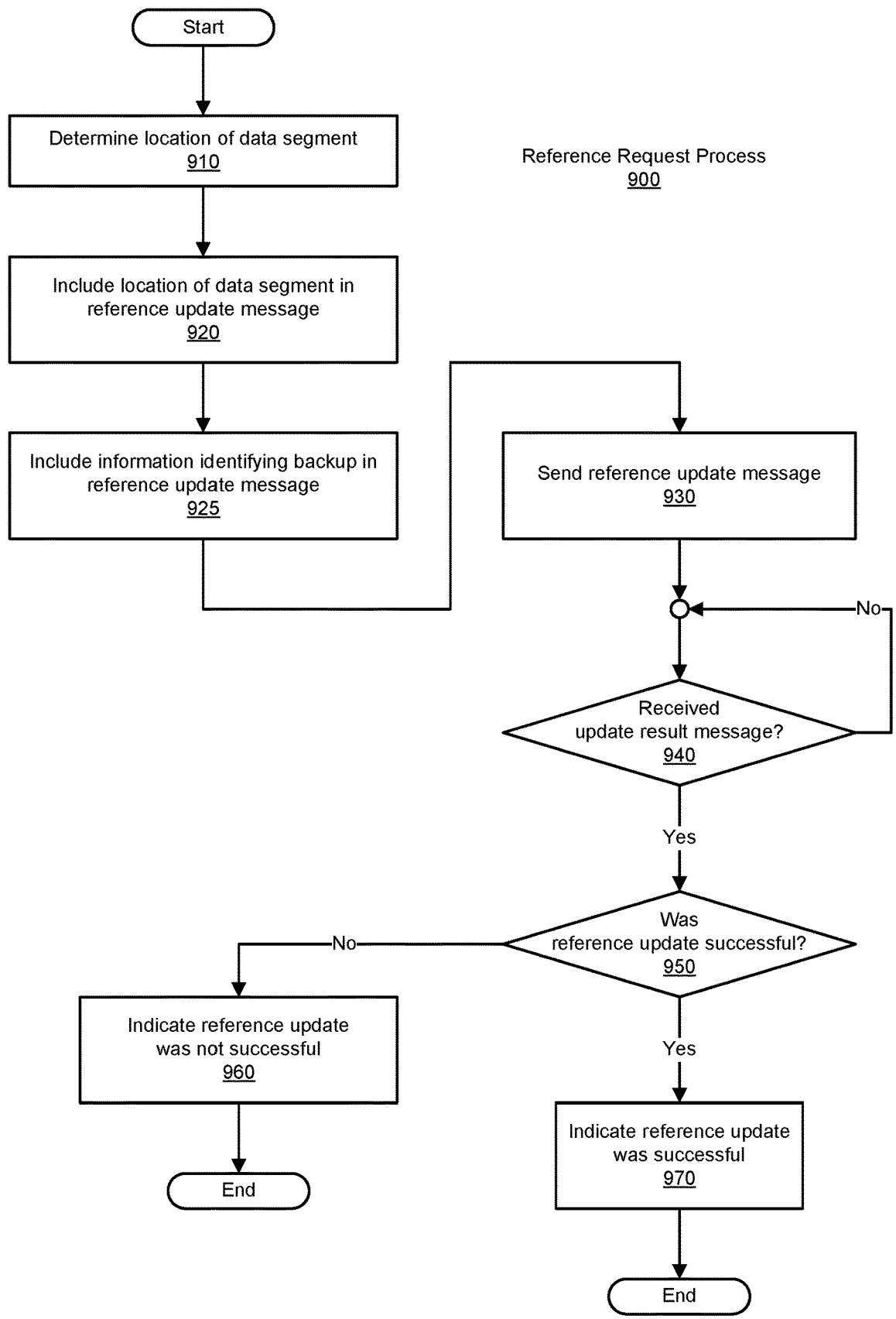
FIG. 9 is a flow diagram illustrating an example of a reference request process implemented in a scalable deduplication system, according to one embodiment.

FIG. 9 is a flow diagram illustrating an example of a reference request process implemented in a scalable deduplication system, according to one embodiment. A reference request process 900 is thus depicted that begins with a determination of the location of the data segment in question (910). Once the location of the data segment in question has been determined, this location information is included in a reference update message (920). Also included in the reference update message is information identifying the backup in question (925). The reference update message is then sent to the assigned node (930). As will be appreciated light of the present disclosure, the reference update message can, in the alternative, be sent directly to a node storing the data segment in question, in certain embodiments. Further in this regard, such embodiments can then send the requisite information (e.g., the location of the data segment and information identifying the back question, as well as information identifying the node storing the data segment) to the assigned node. In any event, a determination is made as to whether an update result messages been received (940). In so doing, reference request process 900 iterates until the receipt of the update result message.

Having received the update result message, a determination is made as to whether the reference update operation was successful (950 close friend. If the update result message indicates that the reference update was unsuccessful, and indication to this effect is made (960) and reference request process 900 concludes. Alternatively, if the update result message indicates that the reference update was successful, and indication to this effect is made (970) and reference request process 900 concludes.

Figure 10:
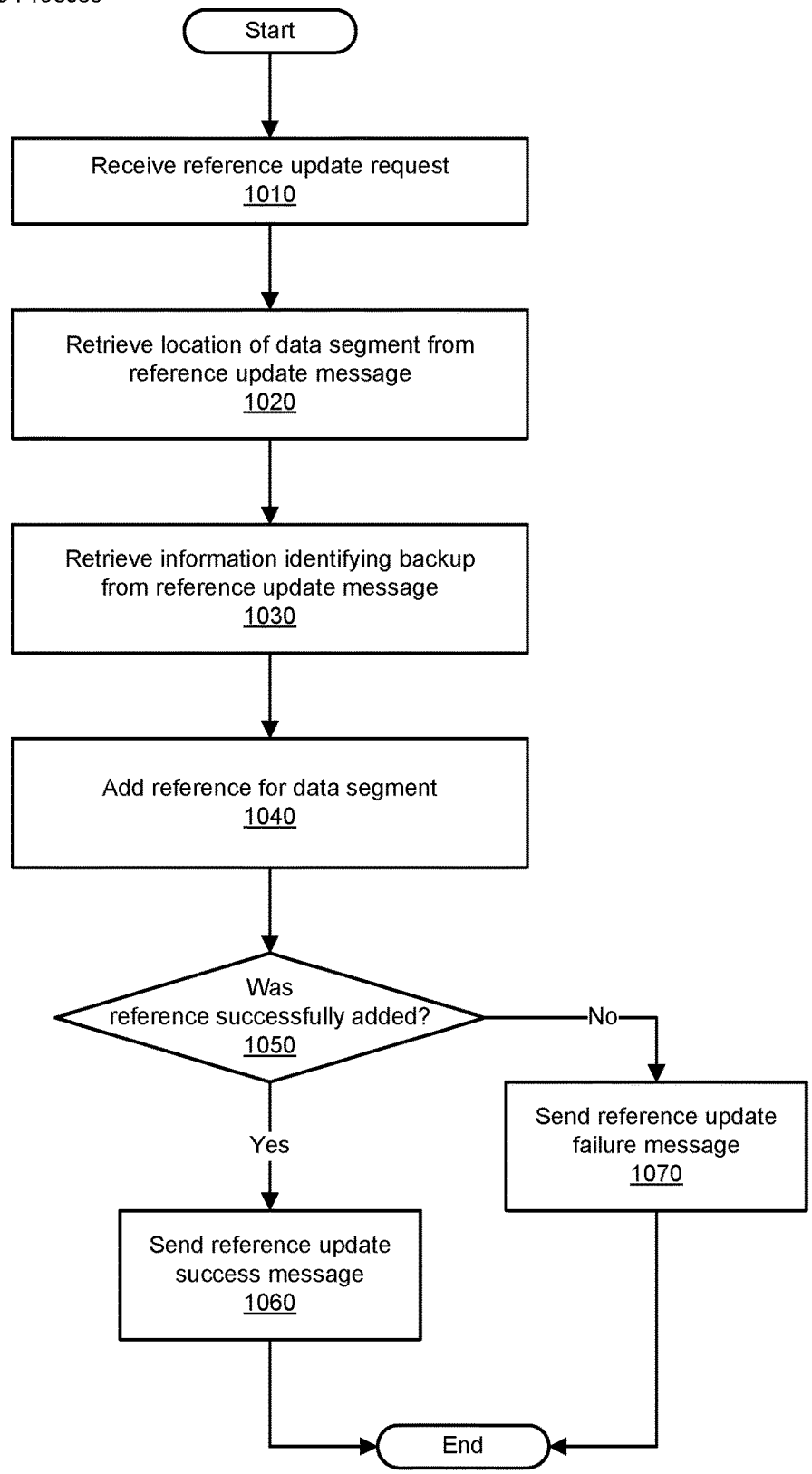
FIG. 10 is a flow diagram illustrating an example of a reference update process implemented in a scalable deduplication system, according to one embodiment.

FIG. 10 is a flow diagram illustrating an example of a reference update process implemented in a scalable deduplication system, according to one embodiment. FIG. 10 thus depicts a reference update process 1000, as can be executed by an assigned node, for example. Reference update process 1000 begins with the receipt of a reference update request (1010), as might be received, for example, from a client system such as one of client systems 110. Once the note in question is in receipt of the reference update request, information regarding location of the data segment in question is retrieved from the reference update message (1020). Also retrieved from the reference update message is information identifying the backup for which the reference is to be updated (1030). At the structure, a reference is added to the metadata for the data segment in question (1040). Such an operation can, for example, result in an update to a local reference database on a given node (e.g., local reference databases to 20 of nodes 130) and/or reference information in a metadata store (e.g., metadata store 240).

An attempt to add the requisite reference having been made, a determination is made as to whether the reference was successfully added (1050). If the reference was successfully added to the metadata in question, a reference update success message is sent by the assigned node, for example, to the client system in question (1060), and reference update process 1000 then concludes. In the alternative, if the addition of the reference was not successful, a reference update failure message is sent by the assigned node to the client system in question (1070), and, as before, reference update process 1000 concludes.

Figure 11:
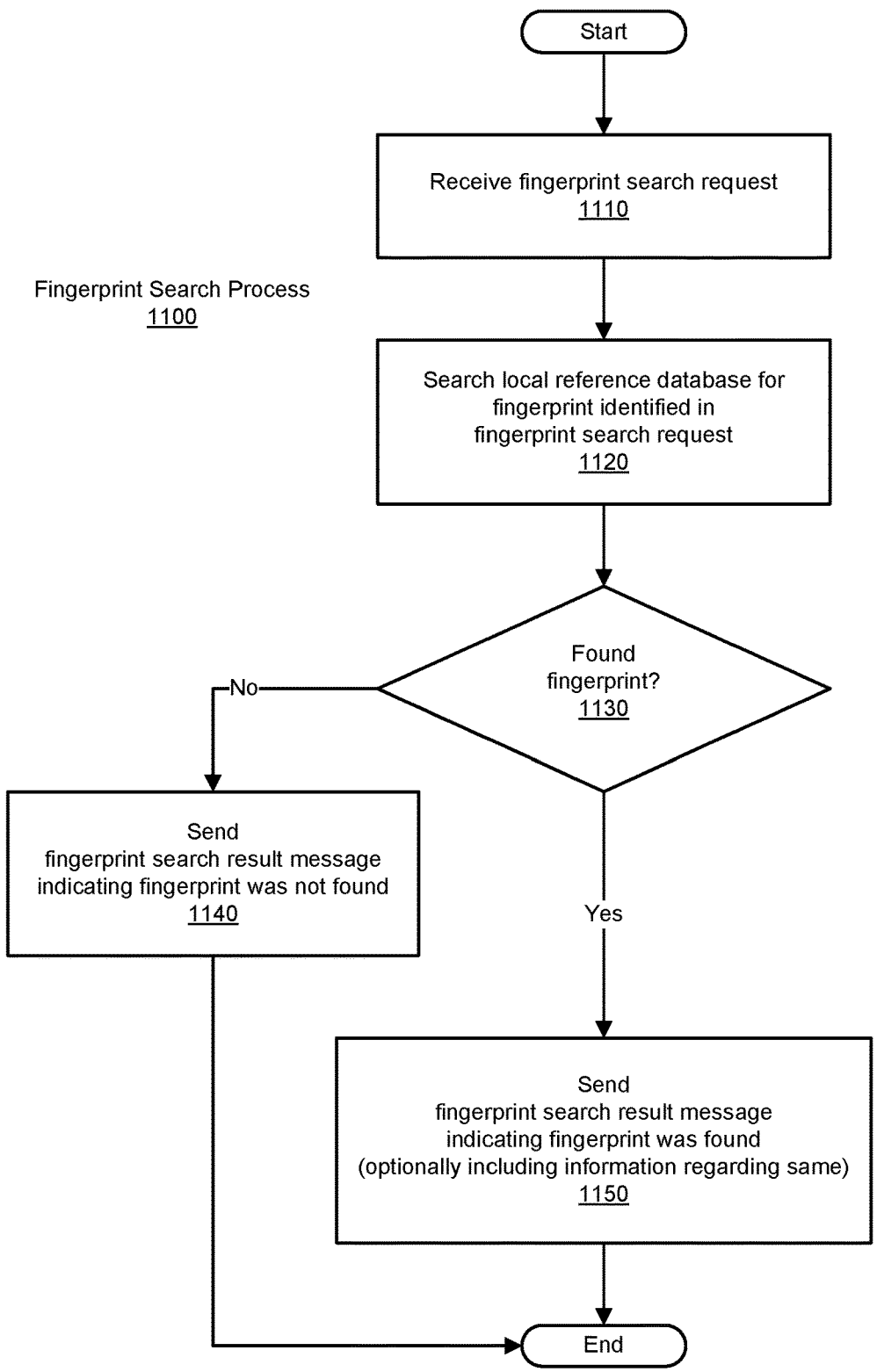
FIG. 11 is a flow diagram illustrating an example of a fingerprint search process implemented in a scalable deduplication system, according to one embodiment.

FIG. 11 is a flow diagram illustrating an example of a fingerprint search process implemented in a scalable deduplication system, according to one embodiment. FIG. 11 thus depicts a fingerprint search process 1100, as can be carried out by an assigned node in performing a fingerprint search requested by a client system. Fingerprint search process 1100 begins with receipt of a fingerprint search request from such a client system (1110). The assigned node then searches the local reference database for the fingerprint identified in the fingerprint search request (1120). A determination is then made as to whether the fingerprint in question has been found (1130). If the fingerprint in question is found at the assigned node, a fingerprint search result message indicating that the fingerprint has been found (and, optionally, including information regarding that fingerprint (e.g., its location and/or other identifying information)) is sent to the requesting client system (1140). Fingerprint search process 1100 then concludes. Alternatively, if the fingerprint in question was not found, a fingerprint search result message is sent indicating that the fingerprint was not found (1150), and figure print search process 1100 once again concludes.

Figure 12:
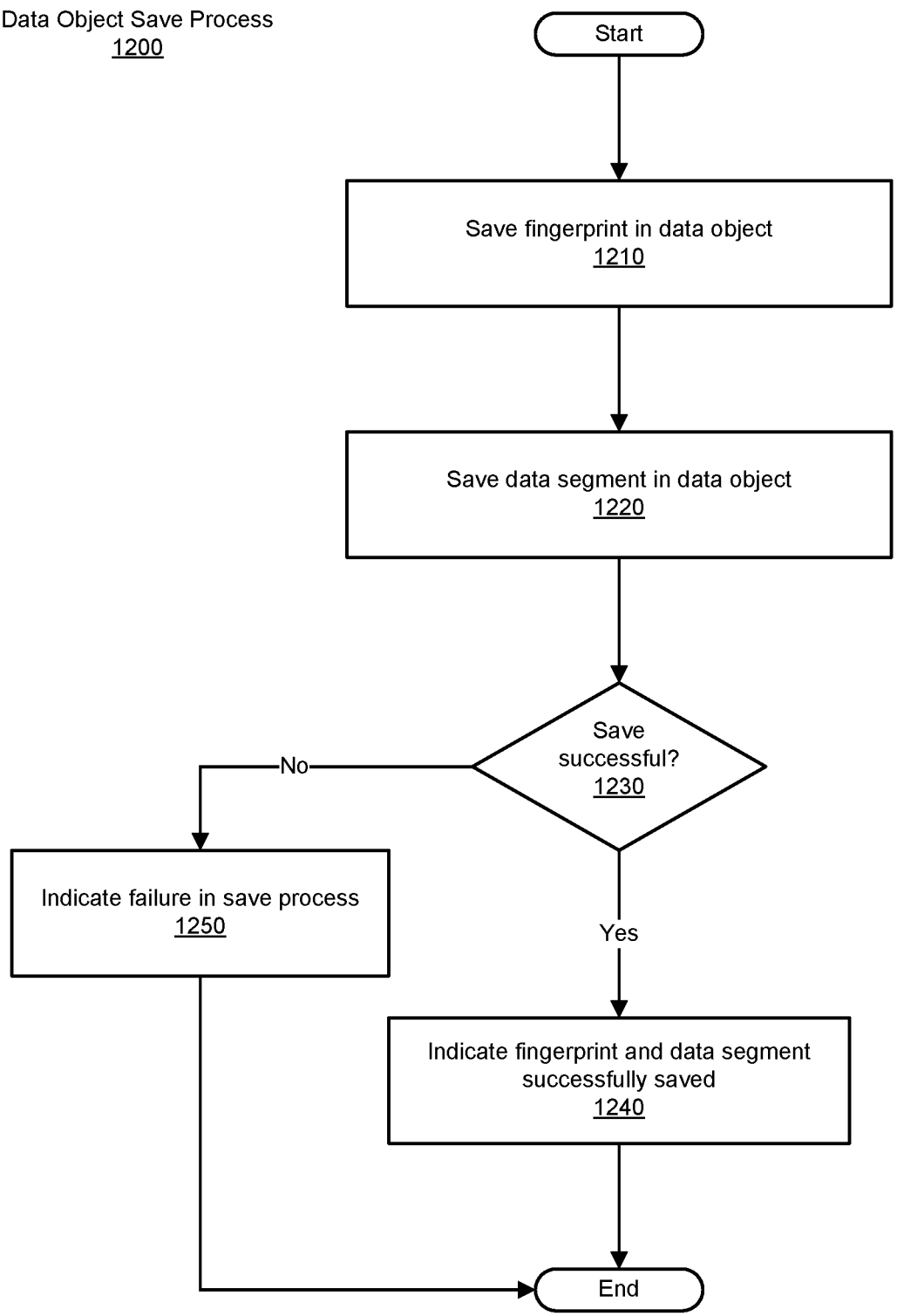
FIG. 12 is a flow diagram illustrating an example of a data object save process implemented in a scalable deduplication system, according to one embodiment.

FIG. 12 is a flow diagram illustrating an example of a data object save process implemented in a scalable deduplication system, according to one embodiment. FIG. 12 thus depicts a data object save process 1200, in which a client system includes a data segment, its associated fingerprint, and other related information, such as information identifying the backup being performed. Data object save process 1200 thus begins with saving the fingerprint in question in the data object (1210). As noted, the data segment in question is also saved in the data object (1220). A determination is then made as to whether the fingerprint, data segment, and, optionally, other related information, was safe successfully in the data object (1230). If the fingerprint, data segment, and, optionally, other related information was successfully saved in the data object, an indication to this effect is made (1240), and data object save process 1200 concludes. Alternatively, if a failure occurred in the saving of the fingerprint, the data segment, and/or other related information, and indication of this failure is provided (1250), and, as before, data object save process 1200 concludes.

Figure 13:
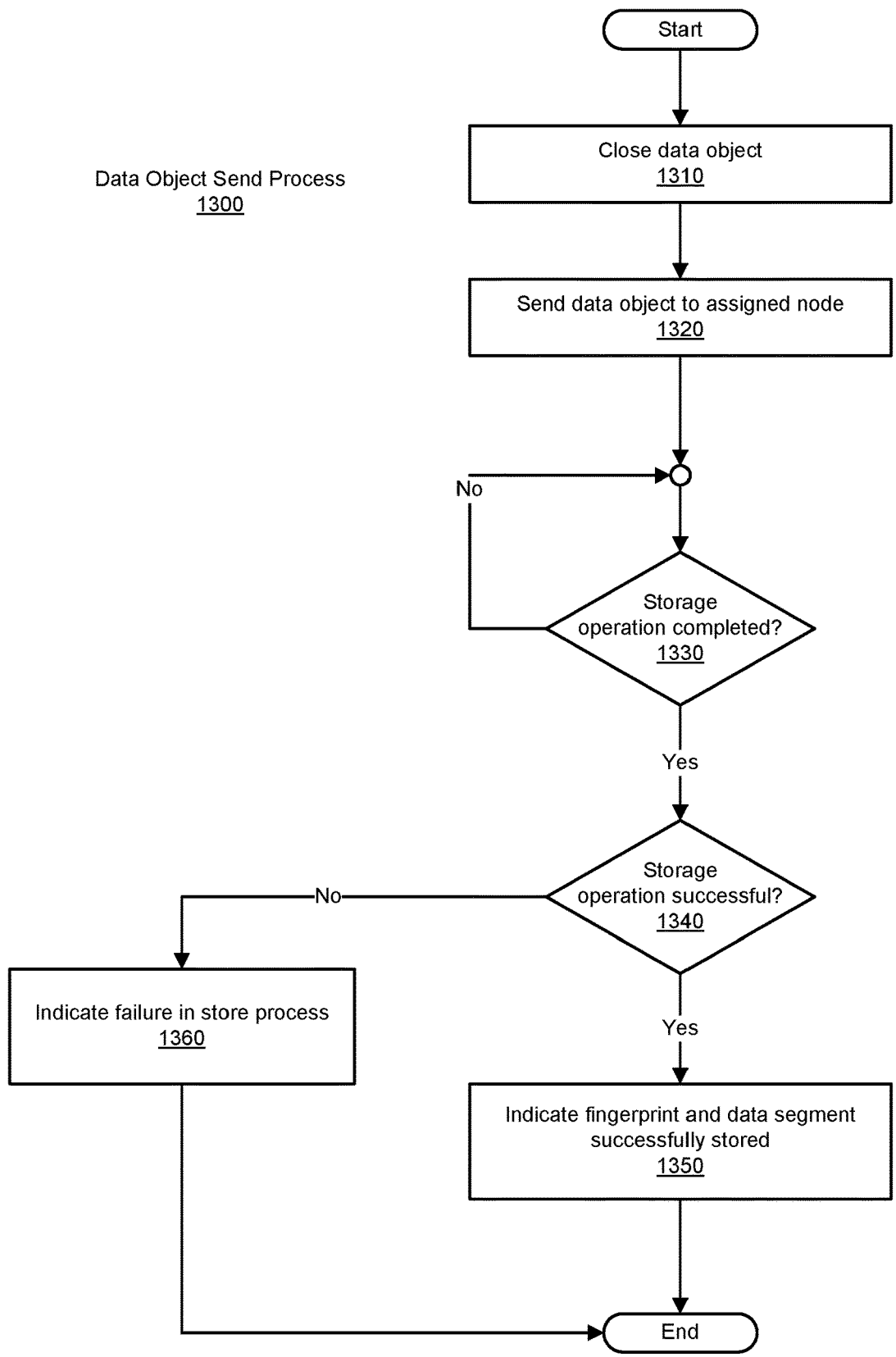
FIG. 13 is a flow diagram illustrating an example of a data object send process implemented in a scalable deduplication system, according to one embodiment.

FIG. 13 is a flow diagram illustrating an example of a data object send process implemented in a scalable deduplication system, according to one embodiment. FIG. 13 thus depicts a data object send process 1300, as can be carried out by a client system sending a data object according to certain embodiments, for example. Data object send process 1300 begins with the closing of the data object by the client system (1310). The data object, having been closed, is then sent to the assigned node (1320). Data object send process

1300 then awaits the receipt of notification from the assigned node, indicating that the storage operation has completed (1330). A determination is then made as to whether the storage operation was successful (1340). If the storage operation was successful, and indication as to the successful storage of the fingerprint, the data segment, and any other related information is provided (1350), data object send process 1300 then concludes. Alternatively, if one or more of the fingerprint, the data segment, and/or any related information is not successful, the failure in the storage process is indicated (1360), and data object send process 1300 once again concludes.

Figure 14:
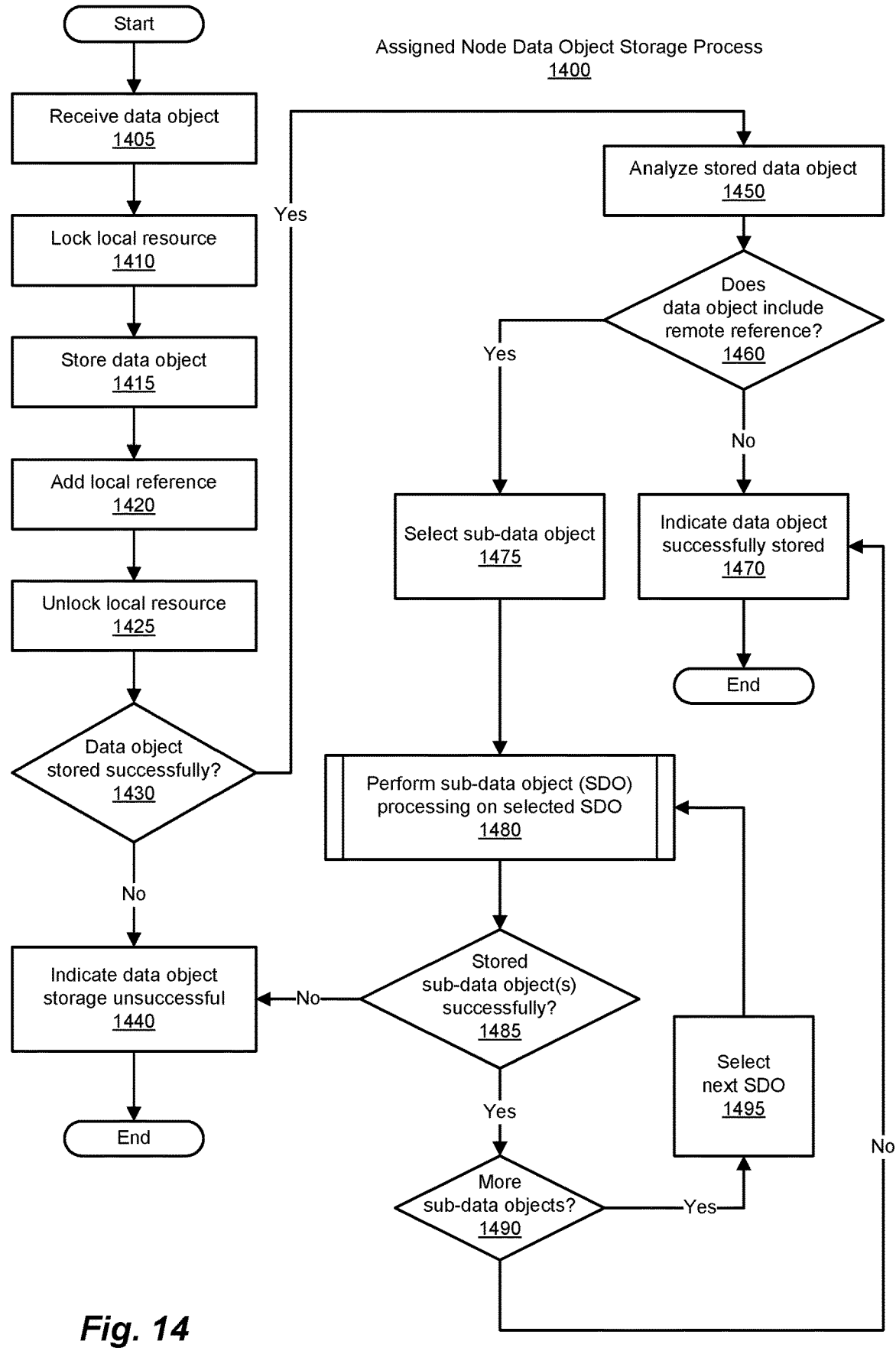
FIG. 14 is a flow diagram illustrating an example of a assigned node data object storage process implemented in a scalable deduplication system, according to one embodiment.

FIG. 14 is a flow diagram illustrating an example of a assigned node data object storage process implemented in a scalable deduplication system, according to one embodiment. FIG. 14 thus depicts an assigned node data object storage process 1400, which begins with the receipt of a data object at the assigned node, having been sent from the client system in question (1405). The assigned node, having received the data object, locks one or more local resources in order to update those resources with the information in the data object received (1410). Information in the data object (e.g., information regarding the fingerprint and associated data segment, as well as other information such as information identifying the backup operation completed) is then stored at the assigned node (1415). At this juncture, one or more local references can be added to the metadata maintained at the assigned node (e.g., in the local reference database and/or in one or more metadata stores) (1420). The aforementioned information having been stored, the one or more local resources can then be unlocked by the assigned node (1425).

A determination is then made as to whether the data object was successfully stored (1430). In the case in which storage of the data object was unsuccessful, an indication to this effect is provided by the assigned node to the client system (1440). Alternatively, if the data object was stored successfully, the store data object is then analyzed by the assigned node (1450). Assigned node data object storage process 1400, having analyzed the store data object, makes a determination as to whether the stored data object includes one or more remote references (1460). In the case in which the store data object does not include any remote references (as used herein, indicating a reference to a data segment maintain on a node other than the assigned node), an indication can be made to the client system indicating that the data object received from the client system was stored successfully (1470). As will be appreciated in light of the present disclosure, such is the case because no further operations are needed to store the data object, the data object having been stored successfully (and having no remote references). Assigned node data object storage process 1400 then concludes.

Alternatively, in the case in which the data object includes one or more remote references (1460), a process of generating one or more corresponding sub-data objects, and either storing a given one of the sub-data objects at the assigned node or sending that information to the appropriate remote node(s) is performed. To this end, a sub-data object is selected from among one or more sub-data objects included in the data object being stored (1475). Sub-data object processing is then performed on the selected sub-data object (1480). An example of a process for generating and sending such sub-data objects is provided in connection with FIG. 15 and its description, subsequently. A determination is then made as to whether the sub-data object in question was saved successfully (1485). In the case in which the sub-data object was not successfully stored, an indication to this effect is sent to the client system (1440). As can be seen in FIG. 14, such indication can be made with respect to the particular sub-data object in question, or more simply by an indication that, as a whole, the data object was not stored successfully.

Alternatively, if the sub-data object in question was successfully stored, a determination can be made as to whether additional sub-data objects remain to be processed (1490). If further sub-data objects remain be processed, assigned node data object storage process 1400 proceeds to the selection of the next sub-data object (1495), and iterates performing the aforementioned sub-data object processing on the selected sub-data object (1480). Assigned node data object storage process 1400 then continues as noted above.

If further sub-data objects do not remain to be processed, assigned node data object storage process 1400 proceeds to making an indication that the data object in question was successfully stored (1470). Assigned node data object storage process 1400 then concludes.

Figure 15A:
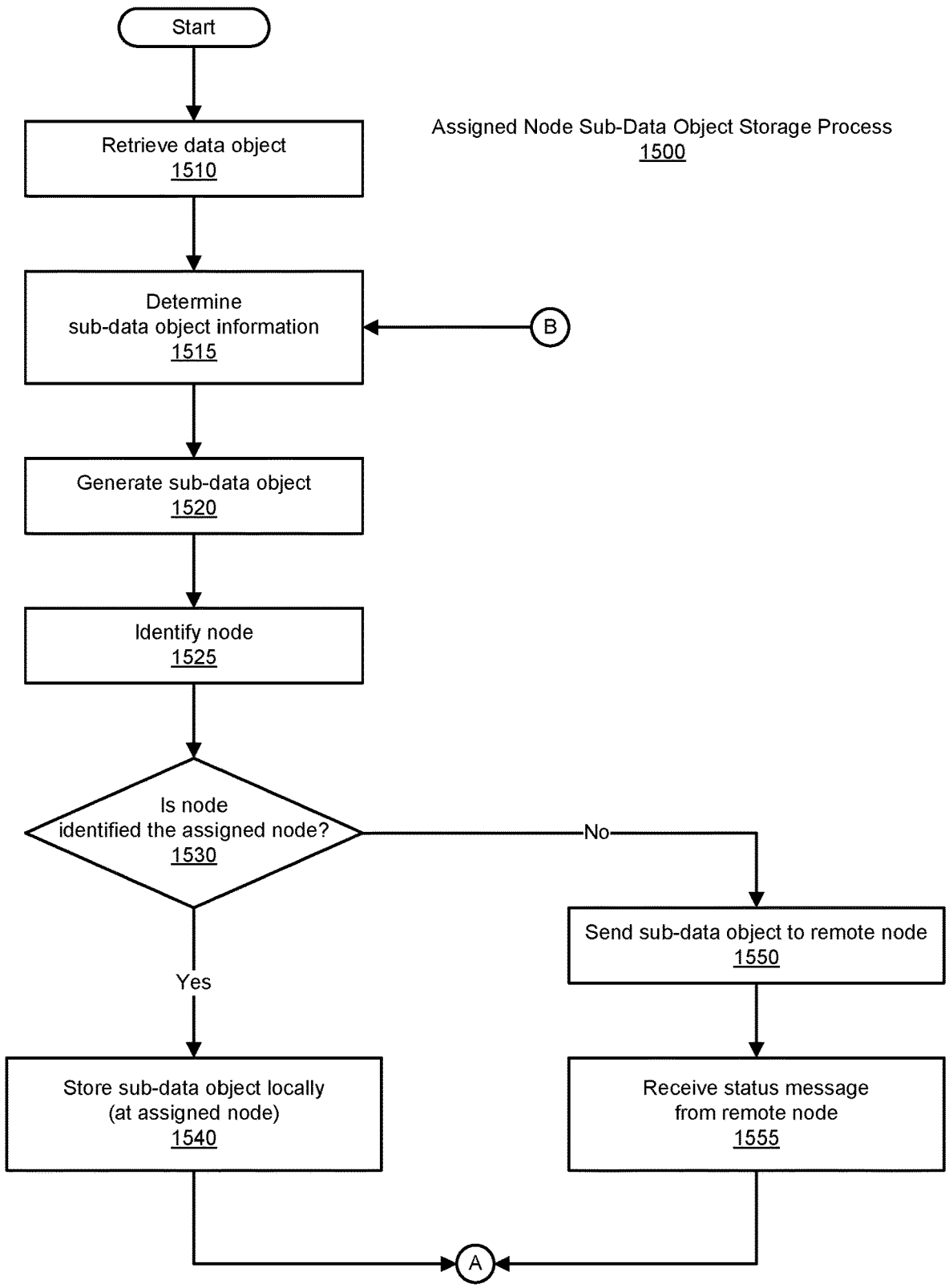
FIGS. 15A and 15B illustrate a flow diagram depicting an example of a assigned node sub-data object storage process implemented in a scalable deduplication system, according to one embodiment.
Figure 15B:
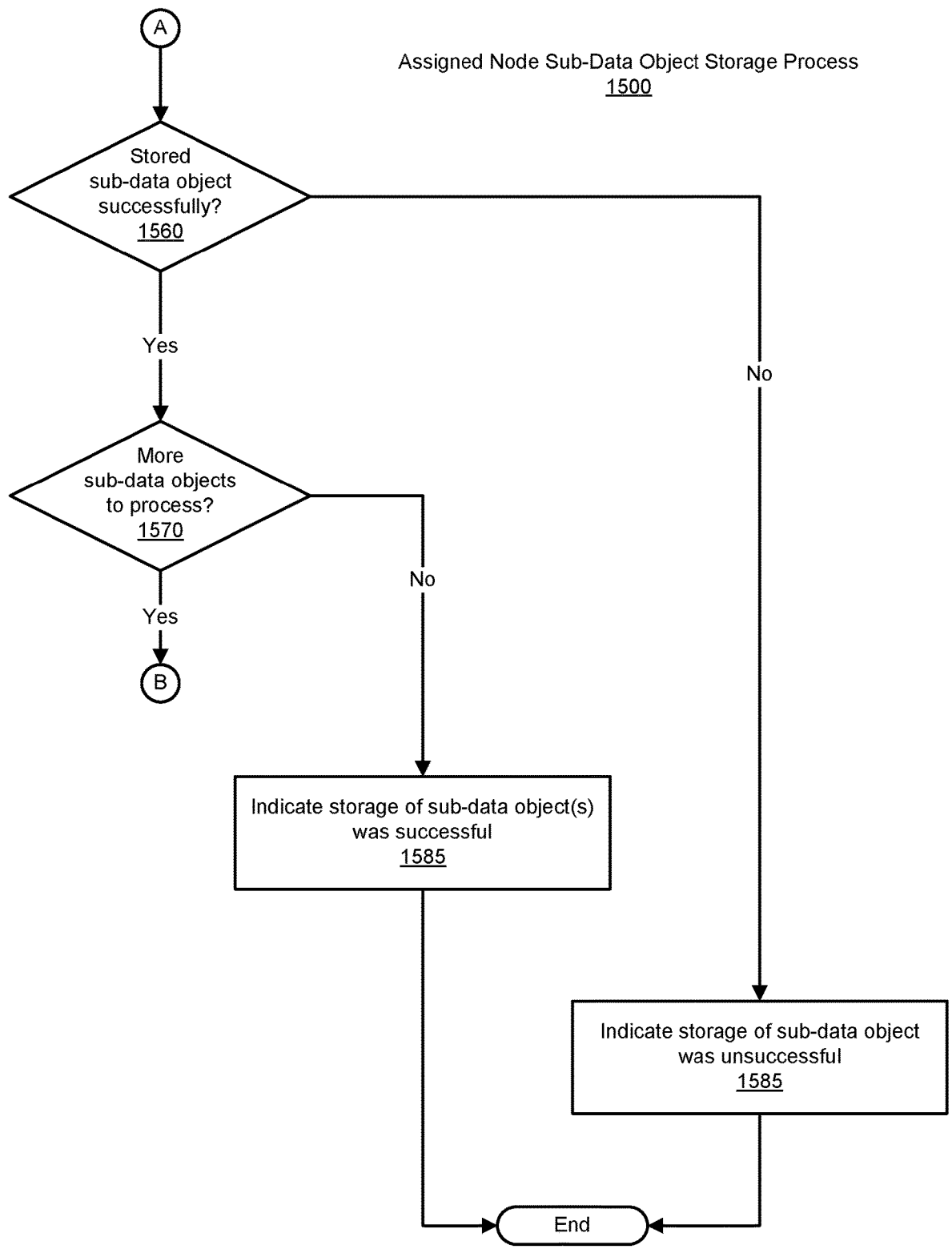

FIGS. 15A and 15B illustrate a flow diagram depicting an example of a assigned node sub-data object storage process implemented in a scalable deduplication system, according to one embodiment. FIGS. 15A and 15B thus depict an assigned node sub-data object storage process 1500, which begins with the identification of the data object in question (1510). Next, sub-data object information for the given sub-data object is determined (1515). The sub-data object itself is then generated (1520). Next, the node that is to maintain the sub-data object is identified (1525). A determination is then made as to whether the node thus identified is the assigned node (1530). If the identified node is the assigned node, the sub-data object is stored locally (at the assigned node), in the manner noted with regard to the storage of the data object (that being the lock, add, unlock sequence noted earlier) (1540). It is to be understood while such an outcome is possible, it will typically not be the case, as such data would simply be stored as part of the data object in question as part of the backup operation (though situations may exist, such as if the sub-data object were the result of a separate backup operation). Alternatively, if the identified node is not the assigned node (and so is another node, such as one of nodes 130, and referred to herein as a "remote node" (indicating that such node is not the assigned node)), the assigned node sends the sub-data object to the remote node (1550). In such situations, the assigned node can send a "reference request" to such remote nodes, where data maintained at such nodes is referenced by the given backup. The assigned node then awaits receipt of a status message from the remote node (1555).

At this juncture, whether stored locally or by a remote node, assigned node sub-data object storage process 1500 proceeds, via connector "A", a determination is made as to whether the sub-data object was stored successfully (1560). In the case in which some manner of failure occurred in the storage of the sub-data object, assigned node sub-data object storage process 1500 proceeds with making an indication that the storage of the sub-data object was unsuccessful (1565), and assigned node sub-data object storage process 1500 concludes.

Alternatively, if the sub-data object in question was successfully stored, a determination as to whether more sub-data objects remain to be processed is made (1570). If further sub-data objects remain to be processed, assigned node sub-data object storage process 1500 proceeds, via connector "B", to making a determination as to the sub-data object information for the next sub-data object (1515), and assigned node sub-data object storage process 1500 continues. In the alternative, if no further sub-data objects remain to be processed, an indication is made to the effect that the storage of the sub-data object(s) was successful (1580), and assigned node sub-data object storage process 1500 concludes.

Figure 16:
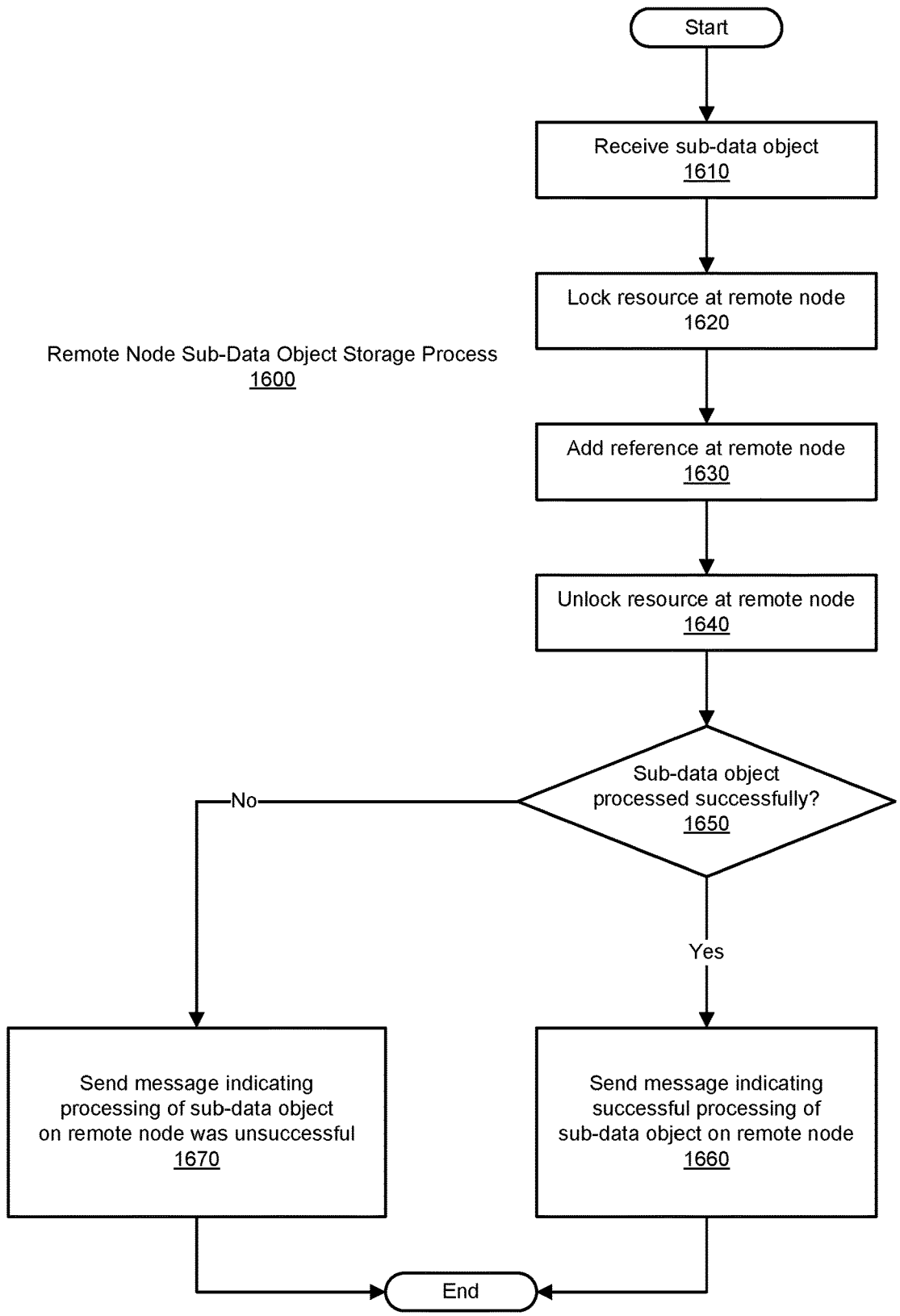
FIG. 16 is a flow diagram illustrating an example of a remote node sub-data object storage process implemented in a scalable deduplication system, according to one embodiment.

FIG. 16 is a flow diagram illustrating an example of a remote node sub-data object storage process implemented in a scalable deduplication system, according to one embodiment. FIG. 16 thus depicts a remote node sub-data object storage process 1600, which begins with the receipt of a sub-data object from the assigned node (1610). In a manner comparable to that noted earlier, the remote node locks the requisite resources in preparation for adding a reference to its data (e.g., a corresponding one of the data segments maintained by the remote node) (1620). The remote node then adds the aforementioned reference (1630), and then unlocks the affected resource(s) (1640). A determination is then made as to whether the sub-data object was processed successfully (1650). If such processing was successful, the remote node sends a message to the assigned node indicating that processing of the sub-data object by the remote node was successful (1660), and remote node sub-data object storage process 1600 concludes. Alternatively, if processing of the sub-data object was not successful, the remote node sends a message to the assigned node indicating that such processing was unsuccessful (1670), and remote node sub-data object storage process 1600 concludes.

Figure 17:
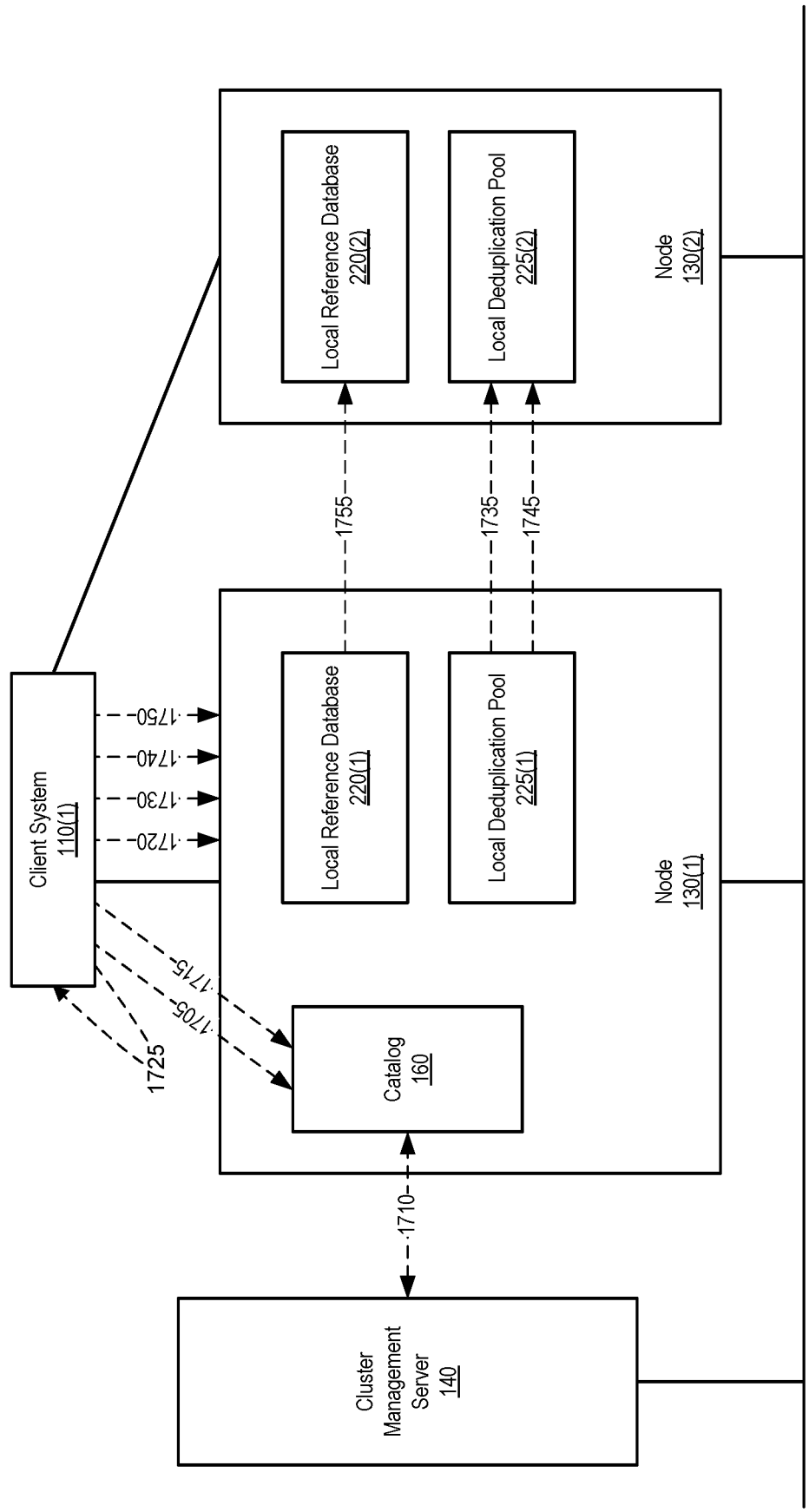
FIG. 17 is a simplified block diagram illustrating an example of components of a scalable backup deduplication system and its operation, according to one embodiment.

FIG. 17 is a simplified block diagram illustrating an example of components of a scalable backup deduplication system and its operation, according to one embodiment. FIG. 17 thus illustrates a scalable deduplication system 1700 that includes certain components described previously in connection with FIGS. 1-5. Scalable deduplication system 1700 once again includes a client system (client system 110(1), or more simply, the client system), nodes (nodes 130(1)-(2), or more simply the first node and the second node), and a cluster management server (cluster management server 140), communicatively coupled in the aforementioned manner. Also as before, a catalog (catalog 160) is maintained at node 130(1), and nodes 130(1)-(2) maintain their respective local reference databases (local reference databases 220(1)-(2), or more simply the first and second local reference databases) and local deduplication pools (local deduplication pools 225(1)-(2), or more simply the first and second local deduplication pools).

The operations illustrated as occurring in scalable deduplication system 1700 are as follows. The client system first determines the identity of the assigned node by referencing catalog 160 (1705), which has been assigned by cluster management server 140 (1710). Having determined the assigned node (in this case, the first node), the client accesses the catalog to determine the location of the previous full backup image and any incremental backup images (1715). The client then reads the signature lists for the full backup and any incremental backups from the assigned node (1720). At this juncture, the client performs a lookup operations (i.e., searches) on the signature lists thus obtained (1725). If the client finds the given signature in the signature lists, a reference can be added to the local reference database in question, subsequently.

Alternatively, if the signature in question is not found in the signature lists, the client performs a lookup operation on the assigned node's location (1730). However, if the assigned node is full, for example, a lookup operation can be performed in the assigned forward node location pool, at the second node (1735). If the signature in question is not found at the first node or the second node, the data segment can be written to the assigned node (1740) and stored in its local deduplication pool (the first local deduplication pool), or, if the first node is full, written to the assigned forward node (the second node) and stored in its local deduplication pool (the second local deduplication pool (1745). At this juncture, the client system can send the signature as a reference to the data segment to the assigned node (the first node) for storage in its local reference database (the first local reference database) (1750), or, if the first node is full, to the assigned forward node (the second node) and stored in its local reference database (the second local reference database) (1755).

In performing a process such as that just described, the client systems of scalable deduplication system 1700 are able to provide data segments and their references to nodes 130 for unique data segments, and add references for non-unique data segments. In so doing, the process of storing such deduplicated backup images also result in the updating of catalog 160, thereby facilitating the storage of further deduplicated backup images.

As can be seen in FIG. 17, a given backup image remains tied to one backup source (e.g., the client system), and node information can be recorded on a per-backup image (and so, per-backup source) basis. Further, the storage of backup images can be assigned (i.e., the assigned node for a given backup image assigned) according to data affinity, allowing for the more efficient use of computing and networking resources. In the case in which a given assigned node becomes full (or becomes overloaded with respect to computing, storage, and/or networking resources), a new node can be chosen based on its resource usage (while being tracked under the related node list for the backup source). Additionally, some or all of the existing data/metadata for a given data source can be moved to the new assigned node. Further still the latest node for a given backup source can be selected, in order to maintain locality of that backup source's data. This can be achieved, in certain embodiments, by selecting the latest node in the backup source node list as the assigned node.

An Example Computing and Network Environment

As noted, the systems described herein can be implemented using a variety of computer systems and networks. The following illustrates an example configuration of a computing device such as those described herein. The computing device may include one or more processors, a random access memory (RAM), communication interfaces, a display device, other input/output (I/O) devices (e.g., keyboard, trackball, and the like), and one or more mass storage devices (e.g., optical drive (e.g., CD, DVD, or Blu-ray), disk drive, solid state disk drive, non-volatile memory express (NVME) drive, or the like), configured to communicate with each other, such as via one or more system buses or other suitable connections. While a single system bus 514 is illustrated for ease of understanding, it should be understood that the system buses 514 may include multiple buses, such as a memory device bus, a storage device bus (e.g., serial ATA (SATA) and the like), data buses (e.g., universal serial bus (USB) and the like), video signal buses (e.g., Thunder-Bolt®, DVI, HDMI, and the like), power buses, or the like.

Such CPUs are hardware devices that may include a single processing unit or a number of processing units, all of which may include single or multiple computing units or multiple cores. Such a CPU may include a graphics processing unit (GPU) that is integrated into the CPU or the GPU may be a separate processor device. The CPU may be implemented as one or more microprocessors, microcomputers, microcontrollers, digital signal processors, central processing units, graphics processing units, state machines, logic circuitries, and/or any devices that manipulate signals based on operational instructions. Among other capabilities, the CPU may be configured to fetch and execute computer-readable instructions stored in a memory, mass storage device, or other computer-readable storage media.

Memory and mass storage devices are examples of computer storage media (e.g., memory storage devices) for storing instructions that can be executed by the processors 502 to perform the various functions described herein. For example, memory can include both volatile memory and non-volatile memory (e.g., RAM, ROM, or the like) devices. Further, mass storage devices may include hard disk drives, solid-state drives, removable media, including external and removable drives, memory cards, flash memory, floppy disks, optical disks (e.g., CD, DVD, Blu-ray), a storage array, a network attached storage, a storage area network, or the like. Both memory and mass storage devices may be collectively referred to as memory or computer storage media herein and may be any type of non-transitory media capable of storing computer-readable, processor-executable program instructions as computer program code that can be executed by the processors as a particular machine configured for carrying out the operations and functions described in the implementations herein.

The computing device may include one or more communication interfaces for exchanging data via a network. The communication interfaces can facilitate communications within a wide variety of networks and protocol types, including wired networks (e.g., Ethernet, DOCSIS, DSL, Fiber, USB, etc.) and wireless networks (e.g., WLAN, GSM, CDMA, 802.11, Bluetooth, Wireless USB, ZigBee, cellular, satellite, etc.), the Internet and the like. Communication interfaces can also provide communication with external storage, such as a storage array, network attached storage, storage area network, cloud storage, or the like.

The display device may be used for displaying content (e.g., information and images) to users. Other I/O devices may be devices that receive various inputs from a user and provide various outputs to the user, and may include a keyboard, a touchpad, a mouse, a printer, audio input/output devices, and so forth. The computer storage media, such as memory 504 and mass storage devices, may be used to store software and data, such as, for example, an operating system, one or more drivers (e.g., including a video driver for a display such as display 180), one or more applications, and data. Examples of such computing and network environments are described below with reference to FIGS. 18 and 19.

Figure 18:
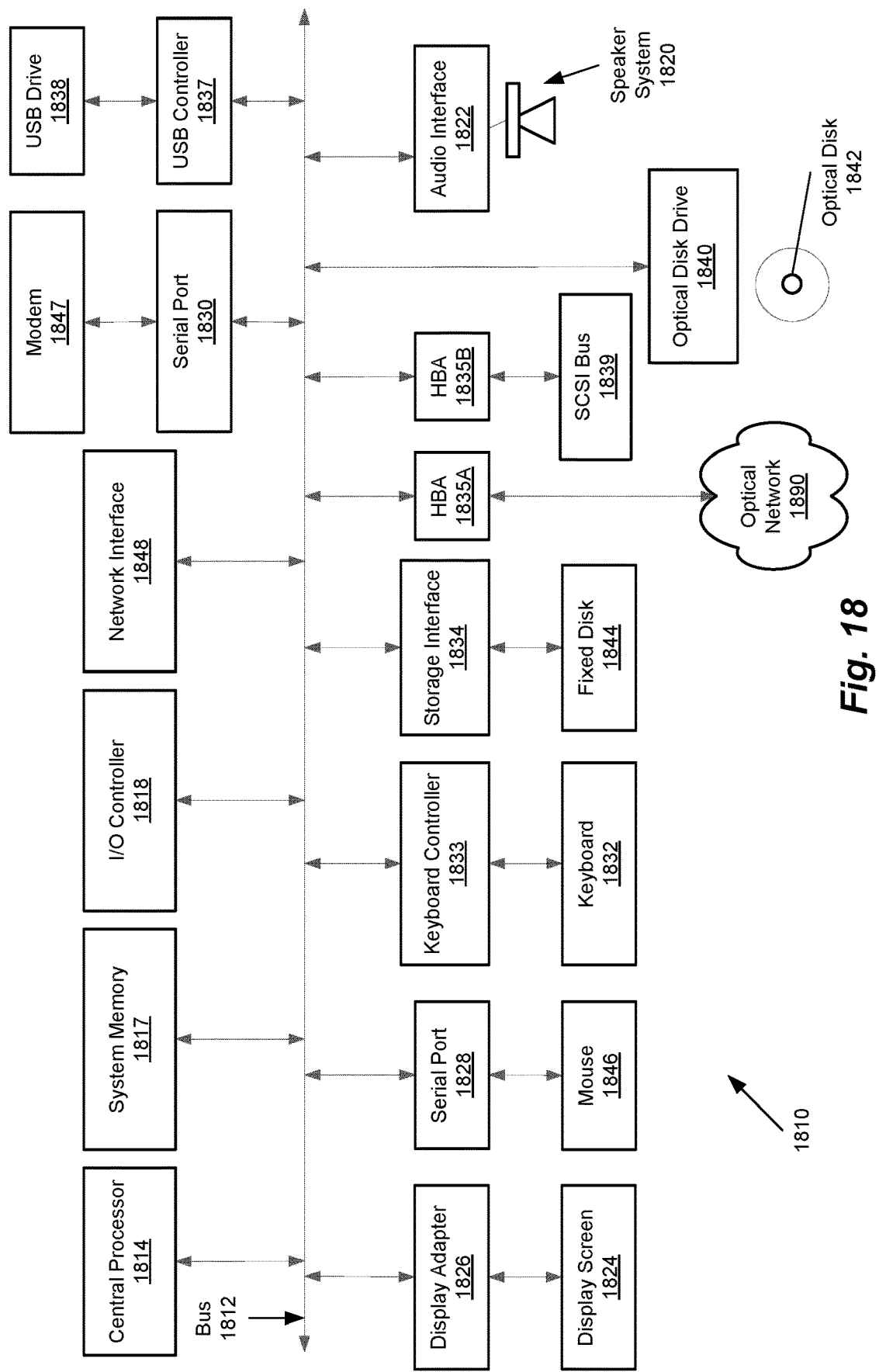
FIG. 18 is a simplified block diagram illustrating components of an example computer system suitable for implementing embodiments of the present disclosure, according to one embodiment.

FIG. 18 depicts a block diagram of a computer system 1810 suitable for implementing aspects of the systems described herein. Computer system 1810 includes a bus 1812 which interconnects major subsystems of computer system 1810, such as a central processor 1814, a system memory 1817 (typically RAM, but which may also include ROM, flash RAM, or the like), an input/output controller 1818, an external audio device, such as a speaker system 1820 via an audio output interface 1822, an external device, such as a display screen 1824 via display adapter 1826, serial ports 1828 and 1830, a keyboard 1832 (interfaced with a keyboard controller 1833), a storage interface 1834, a USB controller 1837 operative to receive a USB drive 1838, a host bus adapter (HBA) interface card 1835A operative to connect with a optical network 1890, a host bus adapter (HBA) interface card 1835B operative to connect to a SCSI bus 1839, and an optical disk drive 1840 operative to receive an optical disk 1842. Also included are a mouse 1846 (or other point-and-click device, coupled to bus 1812 via serial port 1828), a modem 1847 (coupled to bus 1812 via serial port 1830), and a network interface 1848 (coupled directly to bus 1812).

Bus 1812 allows data communication between central processor 1814 and system memory 1817, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1810 are generally stored on and accessed from a computer-readable storage medium, such as a hard disk drive (e.g., fixed disk 1844), an optical drive (e.g., optical drive 1840), a universal serial bus (USB) controller 1837, or other computer-readable storage medium.

Storage interface 1834, as with the other storage interfaces of computer system 1810, can connect to a standard computer-readable medium for storage and/or retrieval of information, such as a fixed disk drive 1844. Fixed disk drive 1844 may be a part of computer system 1810 or may be separate and accessed through other interface systems. Modem 1847 may provide a direct connection to a remote server via a telephone link or to the Internet via an internet service provider (ISP). Network interface 1848 may provide a direct connection to a remote server via a direct network link to the Internet via a POP (point of presence). Network interface 1848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 18 need not be present to practice the systems described herein. The devices and subsystems can be interconnected in different ways from that shown in FIG. 18. The operation of a computer system such as that shown in FIG. 18 will be readily understood in light of the present disclosure. Code to implement portions of the systems described herein can be stored in computer-readable storage media such as one or more of system memory 1817, fixed disk 1844, optical disk 1842, or USB drive 1838. The operating system provided on computer system 1810 may be WINDOWS, UNIX, LINUX, IOS, or other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 19:
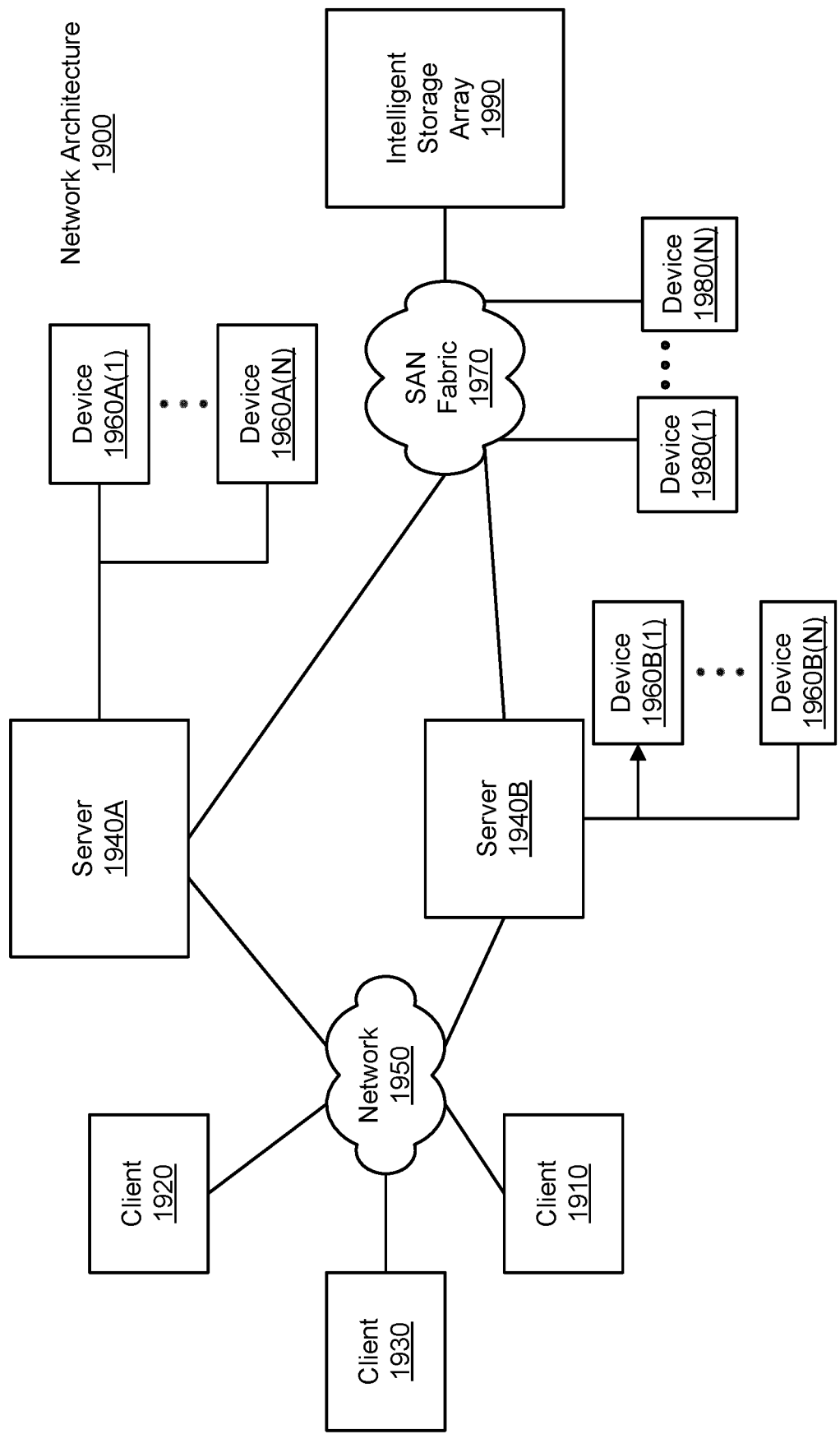
FIG. 19 is a simplified block diagram illustrating components of an example computer system suitable for implementing embodiments of the present disclosure, according to one embodiment.

FIG. 19 is a block diagram depicting a network architecture 1900 in which client systems 1910, 1920 and 1930, as well as storage servers 1940A and 1940B (any of which can be implemented using computer system 1910), are coupled to a network 1950. Storage server 1940A is further depicted as having storage devices 1960A(1)-(N) directly attached, and storage server 1940B is depicted with storage devices 1960B(1)-(N) directly attached. Storage servers 1940A and 1940B are also connected to a SAN fabric 1970, although connection to a storage area network is not required for operation. SAN fabric 1970 supports access to storage devices 1980(1)-(N) by storage servers 1940A and 1940B, and so by client systems 1910, 1920 and 1930 via network 1950. An intelligent storage array 1990 is also shown as an example of a specific storage device accessible via SAN fabric 1970.

With reference to computer system 1810, modem 1847, network interface 1848 or some other method can be used to provide connectivity from each of client computer systems 1910, 1920 and 1930 to network 1950. Client systems 1910, 1920 and 1930 are able to access information on storage server 1940A or 1940B using, for example, a web browser or other client software (not shown). Such a client allows client systems 1910, 1920 and 1930 to access data hosted by storage server 1940A or 1940B or one of storage devices 1960A(1)-(N), 1960B(1)-(N), 1980(1)-(N) or intelligent storage array 1990. FIG. 19 depicts the use of a network such as the Internet for exchanging data, but the systems described herein are not limited to the Internet or any particular network-based environment.

Other Embodiments

The example systems and computing devices described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

Such example systems and computing devices are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

The foregoing thus describes embodiments including components contained within other components (e.g., the various elements shown as components of computer system 1210). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation. As such, the various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

In light of the foregoing, it will be appreciated that the foregoing descriptions are intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    receiving a data object from a client system at an assigned node, wherein
        the assigned node is a node of a plurality of nodes of a cluster,
        the data object is being backed up as part of a backup operation for the client system,
        the assigned node is assigned to the backup operation and stores a catalog for use in the backup operation,
        the data object comprises
            a data segment, and
            a signature, and
        the signature is generated based, at least in part, on data of the data segment;
    determining whether the data object comprises a sub-data object, wherein
        the determining uses the catalog; and
    in response to a determination that the data object comprises the sub-data object,
        processing the data object, wherein
            the backup operation comprises the determining and the processing,
            the assigned node performs the determining and the processing the data object,
            the data segment is stored in a first local deduplication pool at the assigned node,
            the signature is stored in a first local metadata store at the assigned node, and
            the processing the data object comprises
                determining a remote node at which the sub-data object is to be stored,
                generating a reference that identifies the sub-data object and the remote node,
                storing the reference as a stored reference in a catalog at the assigned node, wherein
                    storage of the stored reference in the catalog facilitates access to the sub-data object at the remote node, and
                sending the sub-data object to the remote node, wherein
                    the sending the sub-data object facilitates storage of
                        a data segment of the sub-data object in a second local deduplication pool at the remote node, and
                        a signature of the sub-data object in a second local metadata store at the remote node, and
                    the remote node is another node of the plurality of nodes, other than the assigned node.

2. The method of claim 1, wherein
    the data object comprises a container,
    the container comprises a container deduplicated data store and a container metadata store,
    the container deduplicated data store comprises one or more data segments comprising the data segment, and
    the container metadata store comprises metadata associated with the one or more data segments.

3. The method of claim 2, wherein
    the metadata comprises the signature of the data segment and a location in the container deduplicated data store at which the data segment is stored.

4. The method of claim 3, wherein
    the signature is a fingerprint, and
    the fingerprint was generated by performing a hash function on the data of the data segment.

5. The method of claim 1, wherein the data object comprises a container, and the sending the sub-data object to the remote node comprises:
    sending the container to the remote node; and
    sending a container reference to the remote node, wherein
        the container reference comprises a container identifier that identifies the container.

6. The method of claim 5, further comprising:
    receiving the sub-data object at the remote node;
    storing the container in a local deduplication pool at the remote node; and
    storing the container reference in a local reference database at the remote node.

7. The method of claim 6, further comprising:
    receiving a request for a fingerprint list from a client system;
    retrieving the fingerprint list from a catalog; and
    sending the fingerprint list to the client system.

8. The method of claim 7, further comprising:
    receiving a request for a location of the fingerprint list from the client system;
    determining the location; and
    sending the location to the client system.

9. The method of claim 7, wherein
    the catalog is implemented as a single instance for the cluster.

10. The method of claim 1, wherein the data object comprises a container and a container reference, and the method further comprises:
    storing the container in a local deduplication pool at the assigned node, wherein
        the container comprises
            a deduplicated data store, and
            a metadata store; and
    storing the container reference in a local reference database at the assigned node, wherein
        the container reference identifies the container.

11. The method of claim 1, wherein
    the determining whether the sub-data object is to be stored at the assigned node is based,
    at least in part, on at least one of
        a computational resource of the assigned node, a storage resource of the assigned node,
a network resource of the assigned node, or
the sub-data object being a remote reference.

12. A non-transitory computer-readable storage medium, comprising program instructions, which, when executed by one or more processors of a computing system, perform a method comprising:
receiving a data object from a client system at an assigned node, wherein
the assigned node is a node of a plurality of nodes of a cluster,
the data object is being backed up as part of a backup operation for the client system,
the assigned node is assigned to the backup operation and stores a catalog for use in the backup operation,
the data object comprises
a data segment, and
a signature, and
the signature is generated based, at least in part, on data of the data segment;
determining whether the data object comprises a sub-data object, wherein
the determining uses the catalog; and
in response to a determination that the data object comprises the sub-data object,
processing the data object, wherein
the backup operation comprises the determining and the processing,
the assigned node performs the determining and the processing the data object,
the data segment is stored in a first local deduplication pool at the assigned node,
the signature is stored in a first local metadata store at the assigned node, and
the processing the data object comprises
determining a remote node at which the sub-data object is to be stored,
generating a reference that identifies the sub-data object and the remote node,
storing the reference as a stored reference in a catalog at the assigned node, wherein
storage of the stored reference in the catalog facilitates access to the sub-data object at the remote node, and
sending the sub-data object to the remote node, wherein
the sending the sub-data object facilitates storage of
a data segment of the sub-data object in a second local deduplication pool at the remote node, and
a signature of the sub-data object in a second local metadata store at the remote node, and
the remote node is another node of the plurality of nodes, other than the assigned node.

13. The non-transitory computer-readable storage medium of claim 12, wherein
the data object comprises a container,
the container comprises a container deduplicated data store and a container metadata store,
the container deduplicated data store comprises the data segment,
the signature is a fingerprint,
the container metadata store comprises metadata comprising the fingerprint and a location of the data segment in the container deduplicated data store, and
the fingerprint was generated by performing a hash function on the data of the data segment.

14. The non-transitory computer-readable storage medium of claim 12, wherein
the catalog is implemented as a single instance for the cluster.

15. The non-transitory computer-readable storage medium of claim 12, wherein the data object comprises a container, and the sending the sub-data object to the remote node comprises:
sending the container to the remote node; and
sending a container reference to the remote node, wherein
the container reference comprises a container identifier that identifies the container.

16. The non-transitory computer-readable storage medium of claim 15, wherein the data object comprises a container and the method further comprises:
storing the container in a local deduplication pool at the assigned node, wherein
the container comprises
a deduplicated data store, and
a metadata store; and
storing the container reference in a local reference database at the assigned node, wherein
the container reference identifies the container.

17. A computing system comprising:
one or more processors; and
a computer-readable storage medium coupled to the one or more processors, comprising program instructions, which, when executed by the one or more processors, perform a method comprising
receiving a data object from a client system at an assigned node, wherein
the assigned node is a node of a plurality of nodes of a cluster,
the data object is being backed up as part of a backup operation for the client system,
the assigned node is assigned to the backup operation and stores a catalog for use in the backup operation,
the data object comprises
a data segment, and
a signature, and
the signature is generated based, at least in part, on data of the data segment,
determining whether the data object comprises a sub-data object, wherein the determining uses the catalog, and
in response to a determination that the data object comprises the sub-data object, processing the data object, wherein
the backup operation comprises the determining and the processing,
the assigned node performs the determining and the processing the data object,
the data segment is stored in a first local deduplication pool at the assigned node,
the signature is stored in a first local metadata store at the assigned node, and
the processing the data object comprises
generating a reference that identifies the sub-data object,
storing the reference in a local reference database at the assigned node,
determining a remote node at which the sub-data object is to be stored, and sending the sub-data object to the remote node, wherein
a data segment of the sub-data object is stored in a second local deduplication pool at the remote node,
a signature of the sub-data object is stored in a second local metadata store at the remote node, and
the remote node is another node of the plurality of nodes, other than the assigned node,
the processing the data object comprises
determining a remote node at which the sub-data object is to be stored,
generating a reference that identifies the sub-data object and the remote node,
storing the reference as a stored reference in a catalog at the assigned node, wherein
storage of the stored reference in the catalog facilitates access to the sub-data object at the remote node, and
sending the sub-data object to the remote node, wherein
the sending the sub-data object facilitates storage of
a data segment of the sub-data object in a second local deduplication pool at the remote node, and
a signature of the sub-data object in a second local metadata store at the remote node, and
the remote node is another node of the plurality of nodes, other than the assigned node.

18. The computing system of claim 17, wherein the data object comprises a container,
the container comprises a container deduplicated data store and a container metadata store,
the container deduplicated data store comprises the data segment,
the signature is a fingerprint,
the container metadata store comprises metadata comprising the fingerprint and a location of the data segment in the container deduplicated data store, and
the fingerprint was generated by performing a hash function on the data of the data segment.

19. The computing system of claim 17, wherein
the catalog is implemented as a single instance for the cluster.

20. The computing system of claim 17, wherein the data object comprises a container, and the sending the sub-data object to the remote node comprises:
sending the container to the remote node; and
sending a container reference to the remote node, wherein
the container reference comprises a container identifier that identifies the container.

21. The computing system of claim 20, wherein the data object comprises a container, and the method further comprises:
storing the container in a local deduplication pool at the assigned node, wherein
the container comprises
a deduplicated data store, and
a metadata store; and
storing the container reference in a local reference database at the assigned node, wherein
the container reference identifies the container.

* * * * *